(12) United States Patent
McManus

(10) Patent No.: US 7,444,619 B2
(45) Date of Patent: Oct. 28, 2008

(54) INTER-PROCESS COMMUNICATION USING DIFFERENT PROGRAMMING LANGUAGES

(75) Inventor: Eamonn McManus, Grenoble (FR)

(73) Assignee: Sun Microsystems, Inc., Santa Clara, CA (US)

( * ) Notice: Subject to any disclaimer, the term of this patent is extended or adjusted under 35 U.S.C. 154(b) by 550 days.

(21) Appl. No.: 10/493,525

(22) PCT Filed: Oct. 22, 2001

(86) PCT No.: PCT/IB01/01981

§ 371 (c)(1), (2), (4) Date: May 23, 2005

(87) PCT Pub. No.: WO03/036464

PCT Pub. Date: May 1, 2003

(65) Prior Publication Data

US 2005/0229189 A1    Oct. 13, 2005

(51) Int. Cl.
G06F 9/44 (2006.01)
G06F 9/45 (2006.01)

(52) U.S. Cl. .................. 717/114; 717/136; 717/137

(58) Field of Classification Search ......... 717/114–117, 717/149–152, 136–137
See application file for complete search history.

(56) References Cited

U.S. PATENT DOCUMENTS

| 5,428,792 | A | * | 6/1995 | Conner et al. ............... 717/143 |
| 5,586,330 | A | * | 12/1996 | Knudsen et al. ............. 717/136 |
| 5,889,992 | A | | 3/1999 | Koerber |
| 6,083,276 | A | * | 7/2000 | Davidson et al. ............ 717/107 |
| 6,192,514 | B1 | * | 2/2001 | Lurndal ....................... 717/149 |
| 6,311,327 | B1 | * | 10/2001 | O'Brien et al. ............. 717/114 |
| 6,625,804 | B1 | * | 9/2003 | Ringseth et al. ............. 717/114 |
| 6,976,029 | B2 | * | 12/2005 | Venkatesh et al. ........... 707/102 |
| 7,203,866 | B2 | * | 4/2007 | Di Fabbrizio et al. ......... 714/38 |
| 7,237,232 | B2 | * | 6/2007 | Smith ......................... 717/130 |
| 7,308,460 | B2 | * | 12/2007 | Venkatesh et al. ........... 707/102 |
| 2002/0100014 | A1 | * | 7/2002 | Iborra et al. ................ 717/104 |
| 2005/0039173 | A1 | * | 2/2005 | Tondreau et al. ............ 717/136 |

FOREIGN PATENT DOCUMENTS

WO    WO 01/08008 A1    2/2001

OTHER PUBLICATIONS

Wise, Objective View Point: object-orientation and C++ (part II of II), Feb. 1995, ACM, Crossroads, vol. 1 Issue 3, pp. 1-14.*
International Search Report dated May 21, 2004 (6 pgs.).
M. Gergeleit; "JRPC: Connecting Java Applications with Legacy ONC RPC Servers"; Proceedings of Java-Informations-Tage 1999 (JIT '99); Sep. 20, 1999 (12 pgs.).
"Message Definition Language" Research Disclosure, Kenneth Mason Publications, Hampshire, GB, No. 440, Dec. 2000; pp. 2219-2220 (3 pgs.).
"OLEBridge for Java" Research Disclosure, No. 445, May 1, 2001; p. 840 (5 pgs.).

* cited by examiner

*Primary Examiner*—Wei Y. Zhen
*Assistant Examiner*—Anna Deng
(74) *Attorney, Agent, or Firm*—Osha Liang LLP

(57) ABSTRACT

A method for inter-process communication between a first process and a second process. The method includes receiving a request from the first process for processing a first process call in a first programming language by the second process, where the second process is configured to execute in a second programming language. The method further includes providing the second process with a procedure to emulate the processing of the first process call, where the procedure is defined in a data structure. Finally, the method includes converting the first process call into a second process call to the procedure using the data structure, executing the second process call using the procedure to obtain a result, and returning the result to the first process.

15 Claims, 16 Drawing Sheets

| Java | C (RPC) |
| --- | --- |
| Java Primitive types: | C/RPC primitive types |
| byte, short, char, | int |
| int (32 bits) | int |
| long (64 bits) | hyper |
| boolean | bool |
| float | float |
| double | double |
| wrapped primitive type | same as primitive type |
| String | string<> (unbounded) |
| Arrays: | |
| int, long, float, double | RPC array of same type |
| short, char | RPC array of int type |
| byte, boolean | RPC opaque array (bytes) |
| other translatable type X | Array of the RPC translation of X |
| Classes | |
| struct-like class | struct ("C object") |
| Remote Interface | RPC program declaration |

FIG.12

INTER-PROCESS COMMUNICATION USING DIFFERENT PROGRAMMING LANGUAGES

This invention pertains to the computer software technology.

In today's networked world, it is increasingly rare for applications to run alone. A typical application interacts with other applications through networking. Often this is done through text-based protocols like XML, but efficiency may demand that a binary protocol be used.

Existing binary mechanisms enable intercommunication between processes in distributed computer systems, or in a single computer station. For example, Java utilizes the Remote Method Invocation (RMI), while C utilizes a different tool, called Remote Procedure Call (RPC). Now, a difficulty arises in the presence of different programming languages, which have different inter-process communication tools. For example, in a telecommunication network system, both Java and the C programming language may be used in certain modules, e.g. in base stations controllers.

This invention further considers the conversion of code, which may be featured as a method of aiding code conversion, from code corresponding to a software object having a main object class, said code being in a first programming language, the method comprising the steps of:
a. building a program skeleton in a second programming language, with a first procedure skeleton corresponding to the main object class,
b. building other procedures in the program skeleton for possible parent classes of the main object class,
c. scanning the code of the software object for another class it references, meeting a given condition, while building another procedure in the program skeleton for each such referenced class being found, and, iteratively, for each class being referenced in a such referenced class, and meeting the given condition, until no referenced class is found.

Figure 1:
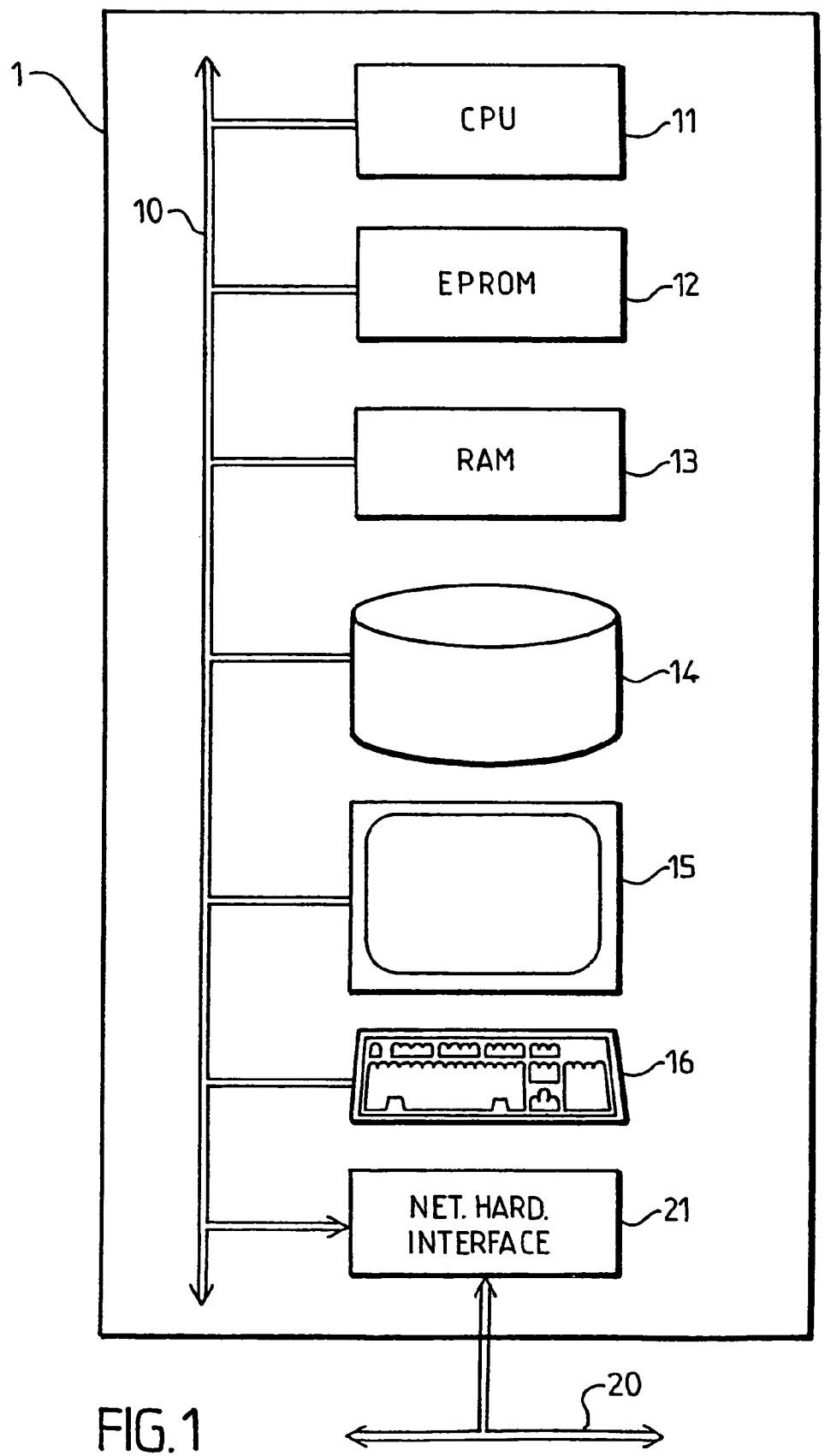

This invention maybe implemented in a computer system, or in a network comprising computer systems. The hardware of such a computer system is for example as shown in FIG. 1, where:
 11 is a processor, e.g. an Ultra-Sparc;
 12 is a program memory, e.g. an EPROM for BIOS;
 13 is a working memory, e.g. a RAM of any suitable technology (SDRAM for example);
 14 is a mass memory, e.g. one or more hard disks;
 15 is a display, e.g. a monitor;
 16 is a user input device, e.g. a keyboard and/or mouse; and
 21 is a network interface device connected to a communication medium 20, itself in communication with other computers. Network interface device 21 may be an Ethernet device, a serial line device, or an ATM device, inter alia. Medium 20 may be based on wire cables, fiber optics, or radio-communications, for example.

Data may be exchanged between the components of FIG. 1 through a bus system 10, schematically shown as a single bus for simplification of the drawing. As is known, bus systems may often include a processor bus, e.g. of the PCI type, connected via appropriate bridges to e.g. an ISA bus and/or an SCSI bus.

FIG. 1 is exemplary only. Computer stations in which this invention is applicable may comprise only part of the components of FIG. 1: some stations may have no user interface and/or no hard disk, for example.

Figure 2:
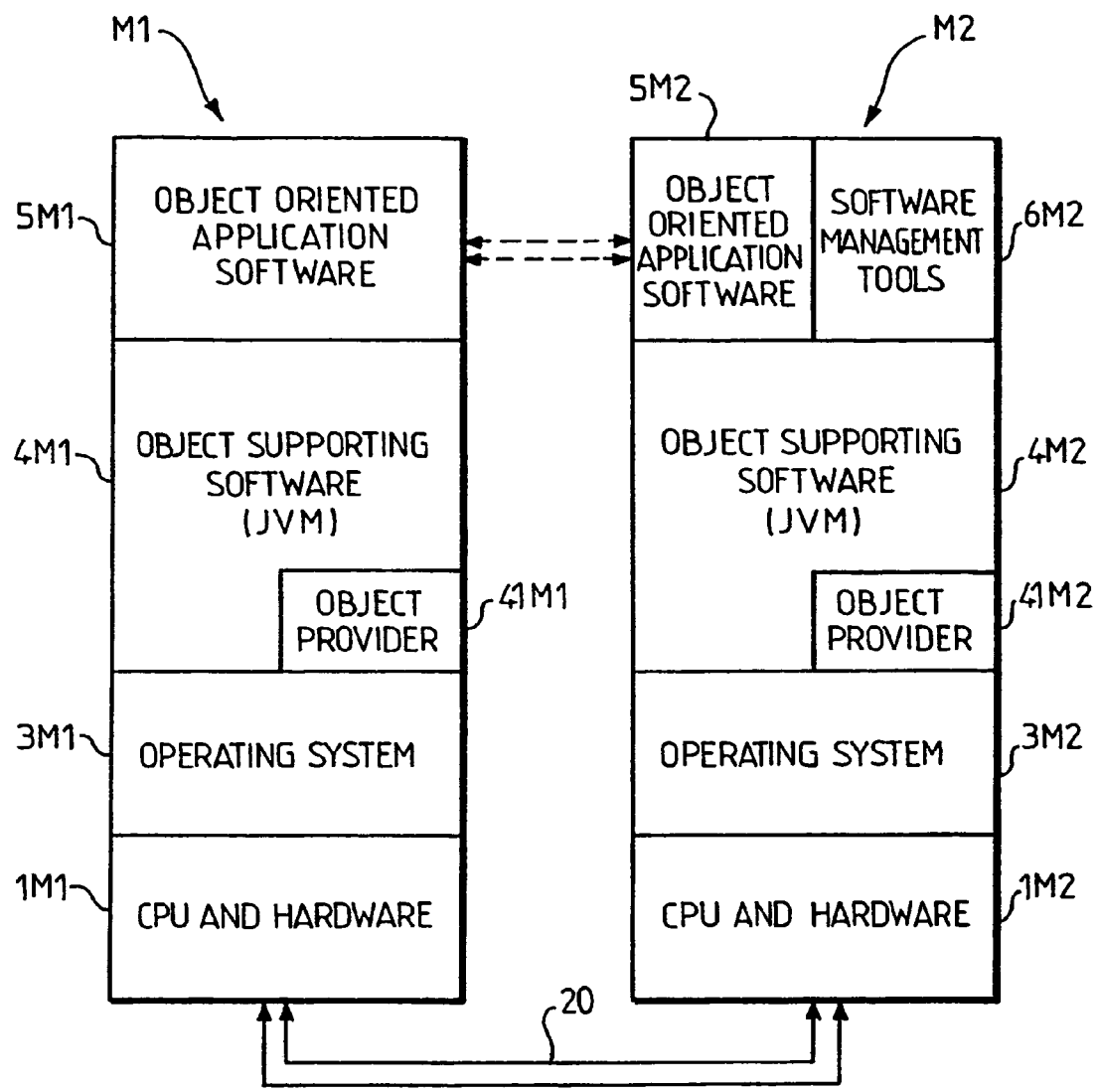

FIG. 2 shows a simple distributed environment, in the example of two machines M1 and M2, interconnected by a link 20, e.g. a network medium. The invention may also apply within a single machine. The machines may have the exemplary structure of FIG. 1, or any equivalent structure. In FIG. 2, the CPU and hardware of FIG. 1 is diagrammatically shown as 1M1 and 1M2. In the drawing, the blocks showing the same functions are identified by the same reference number, immediately followed by the machine identifier, which may be omitted in this description. Each computer system also has an operating system 3, e.g. Solaris. Operating systems other than Solaris may be used in accordance with the invention. An object supporting software 4 may be installed over operating system 3.

The object supporting software 4 may e.g. include the necessary software to build a Java virtual machine or JVM. It includes an object processor or object provider 41, e.g. the ClassLoader class of the Java language. Object supporting software other than a JVM may be used in accordance with the invention. The object supporting software 4 may then serve to run object oriented application software 5. When required, changes in object oriented application software 5 may be made using software management tools 6. The software management tools may be designed in accordance with the JMX specification. However, the invention may apply to other software management tools as well.

As shown, an exemplary architecture may include the object oriented application software 5M1 in machine M1, and the software management tools 6M2 in machine M2, which thus may be dedicated to software management. However, many other combinations are possible, based on two machines or more. Provision for a management dedicated machine is an option. One or more machines may include both application software and management tools, as shown in FIG. 2. Also, each machine may support one or more Java virtual machines or other types of machines or devices.

The reader is assumed to be familiar with object oriented programming in general, more specifically with Java. Details may be found at:
 http://Java.sun.com and/or in the corresponding printed documentation, e.g. "The Java Language Specification", J. GOSLING, Bill Joy, Guy STEELE, Addison Wesley, 1996, ISBN 0-201-63451-1. Further features of Java are:
 Java Dynamic Management Kit, available at
  http://www.sun.com/software/java-dynamic/
 JSR-003: Java Management Extensions (JMX), available at
  http://java.sun.com/products/JavaManagement/ and/or in the corresponding printed documentation.

In object oriented programming, an object may comprise properties (or "fields") and methods, together termed [object] members. For convenience, the methods are usually identified by their name followed with (). Where a method requires parameters, these are inserted between the two round brackets. Most of the methods are directed to the members or internal contents of the object: get() for reading a property, set() for writing a property, other property-related methods, access to other methods, etc. . . .

A method contained in an object may be inter alia public or private; this determines whether it is accessible (may be invoked) from outside the object, or not. Object members may also be static or transient.

Object oriented programming also uses "classes", which may serve the following purposes:
 objects may be "instantiated" from a class, using an object constructor (in short, a constructor); in Java, a constructor is a method having the same name as the class it belongs to.

a class may "extend" a parent class, thus inheriting the properties and methods of the parent class.

A language like Java also supports a special type of entity, named "interfaces". Interfaces may be viewed as a special form of classes, which may support multiple inheritance. Interfaces may basically contain abstract methods. The word "interface" is used herein to refer to such entities. It covers any similar entities which may be developed in a language other than Java. A class may "implement" an interface. This means that the class concretely defines the abstract methods existing in the interface.

Figure 3:
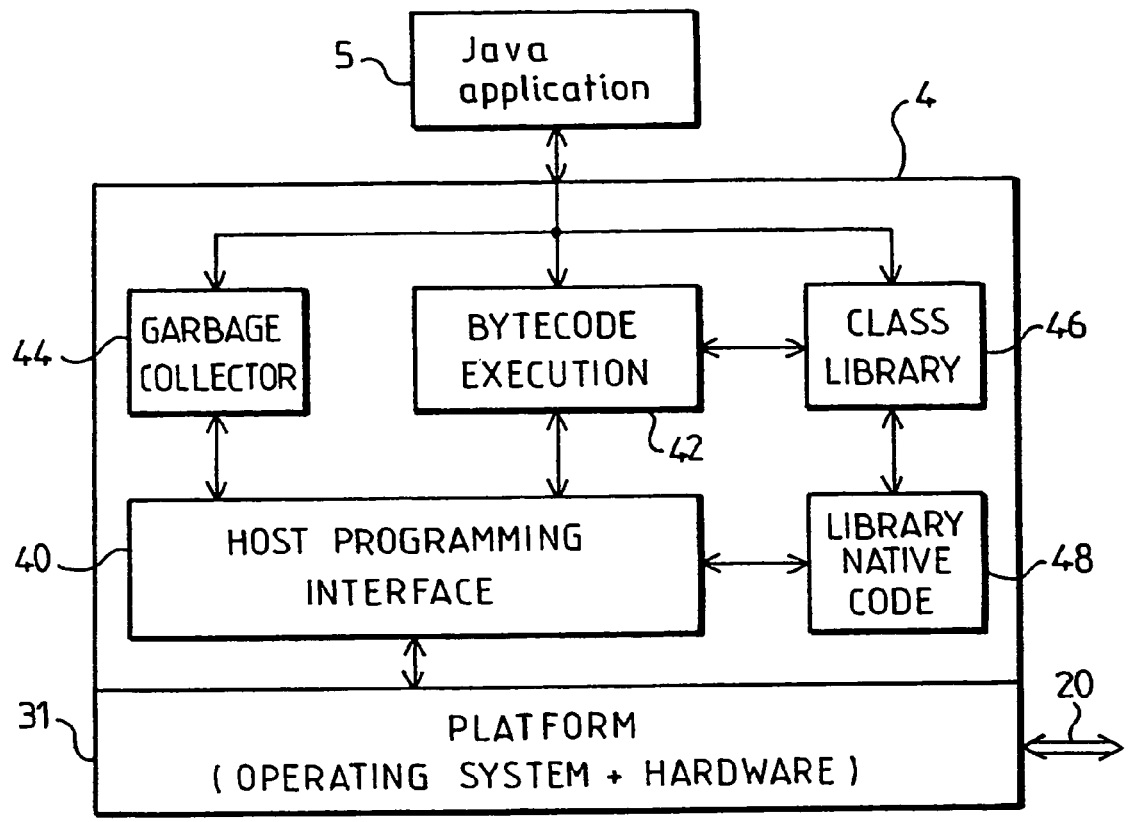

The general structure of an exemplary Java Virtual Machine is shown in FIG. 3. The platform 31 comprises the hardware 1 and operating system 3 of FIG. 1, together with network connection 20. To support Java application 5, the Java Virtual Machine 4 has a host programming interface or HPI 40, a bytecode execution module 42, a garbage collector (GC) 44, a class library 46, and a library native code module 48. The bytecode execution module 42 may be e.g. a bytecode interpreter, or a just-in-time compiler, as known.

Figure 4:
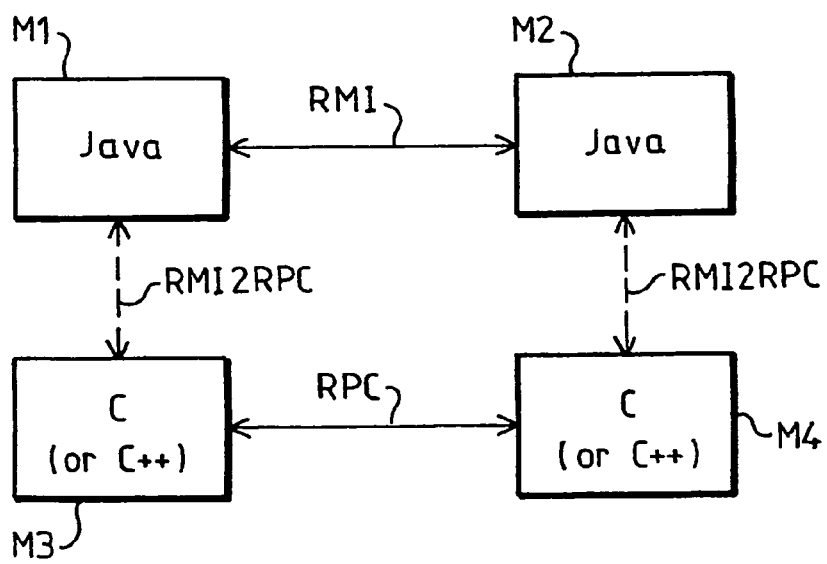

Now, FIG. 4 shows by way of example four computer stations M1, M2, M3, M4, which may be remote from each other as desired. Alternatively, the items M1, M2, M3, M4 may be viewed as processes in a common computer station, at least partially.

Figure 5:
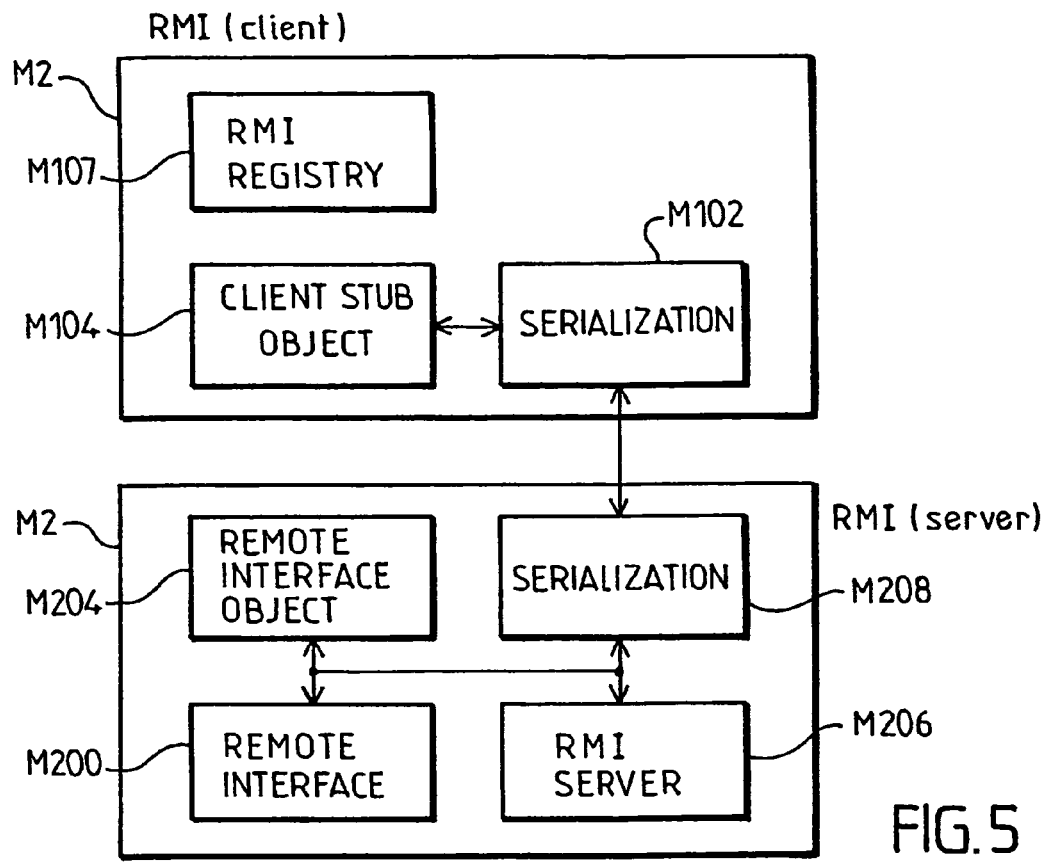

Assuming stations M1 and M2 use Java, they may communicate with each other by means of the Remote Method Invocation (RMI), which is the standard Java building block for systems consisting of more than one program, potentially running on more than one machine. As shown in FIG. 5, in a station (or process, or Java Virtual Machine), e.g. M2, a Java interface M200 may be marked as Remote, thus qualifying as a RMI interface. In station M2, an object M204 implementing interface M200 may be created by a program M206 acting as an RMI server; then, e.g. in another station (or process, or Java Virtual Machine) M1, RMI clients may obtain a client stub M104, which is an object implementing the same Remote interface as M200. In other words, each client stub object M104 is linked to a (remote) server object M204 in such a way that calling a method on the stub object M104 causes the following: the same method is called on the server object M204, and the results of the method in the server object M204 are sent back to the original caller in the client stub object M104. If an exception is encountered while executing the server method, this exception is propagated to the client caller. Thus the client sees almost no difference from a local method call.

RMI client stubs like M104 are obtained either from a name service M107 called the RMI registry, or when the return value of a method invoked on another client stub is a Remote interface.

Bidirectional communication tools or objects are used to enable communication between machines M1 and M2. In the example, the machines M1 and M2 have the Java serialization tools M102 and M208. The RMI protocol uses the Java's serialization to send method parameters from the client M104 to the server M206, and to send method results or exceptions back from the server M206 to the client M104. Serialization is a powerful mechanism that allows Java objects of essentially all data types (even complex and potentially cyclic data structures such as hash tables) to be converted into a stream of bytes at M102 and then reconstructed from that stream as equivalent Java objects at M208. This enables method parameters to be copied from the client to the server (i.e. "passed by value"). For non-primitive parameters, that is a difference from local Java semantics, where objects are passed by reference. A local Java method can modify objects received as parameters, while a remote one cannot. Furthermore, serialization knows about the real data types of Java objects; so for instance if an RMI parameter is declared with the generic type Object but the actual parameter is of its subtype String, then the server method will receive a String copy of the client's String.

Figure 7:
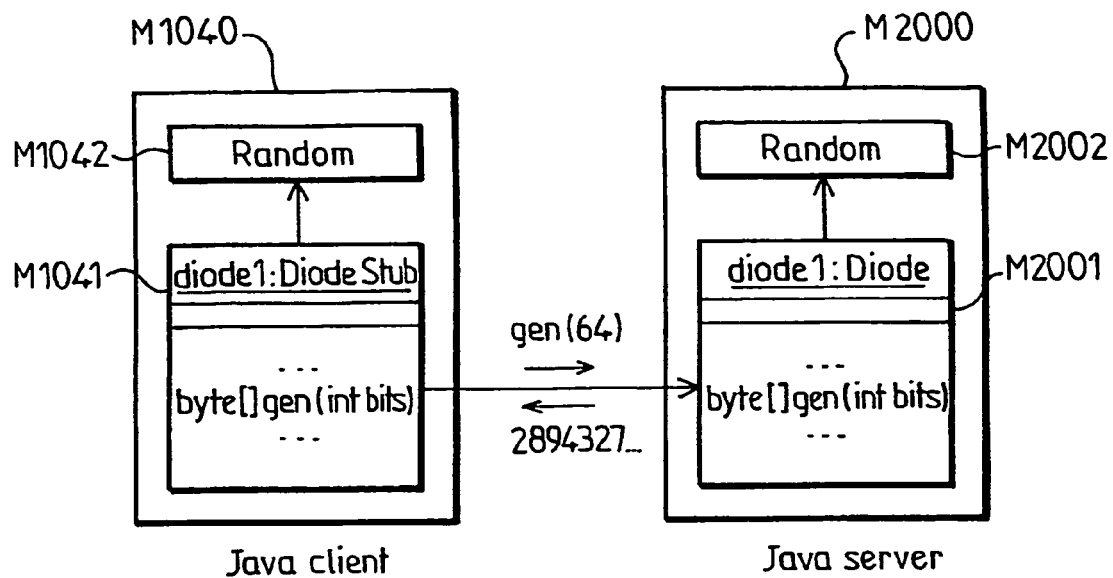

A very simple example is shown in FIG. 7. An exemplary client stub M1040 has a stub object M1041, arbitrarily named "diode1" here. The name "diode1" is stored at M107. Object M1041 implements "Random" interface M1042, and includes the method (expressed in Java):

byte[] gen(int bits)

which means a gen() method receiving a parameter "bits" of type int, and returning an object of type byte[]. For the purpose of the example, it is assumed that this method needs a remote interface M2000, having an object M2001, also named "diode1". Object M2001 also implements "Random" interface M2002, and includes the same method as object 2001, however now with its execution code. Using serialization, stub object M1041 sends a request like gen(64) to server object M2001, which returns a byte array. This shows how method parameters (here 64) may be copied from the client to the server.

More information on RMI may be found at
http://java.sun.com/j2se/1.3/docs/guide/rmi/index.html, and/or in the corresponding printed documentation.

The above described RMI technique will be referred to hereinafter as "true RMI". It enables a Java program to invoke methods on objects in another program with hardly more effort than invoking methods on its own objects.

Figure 6:
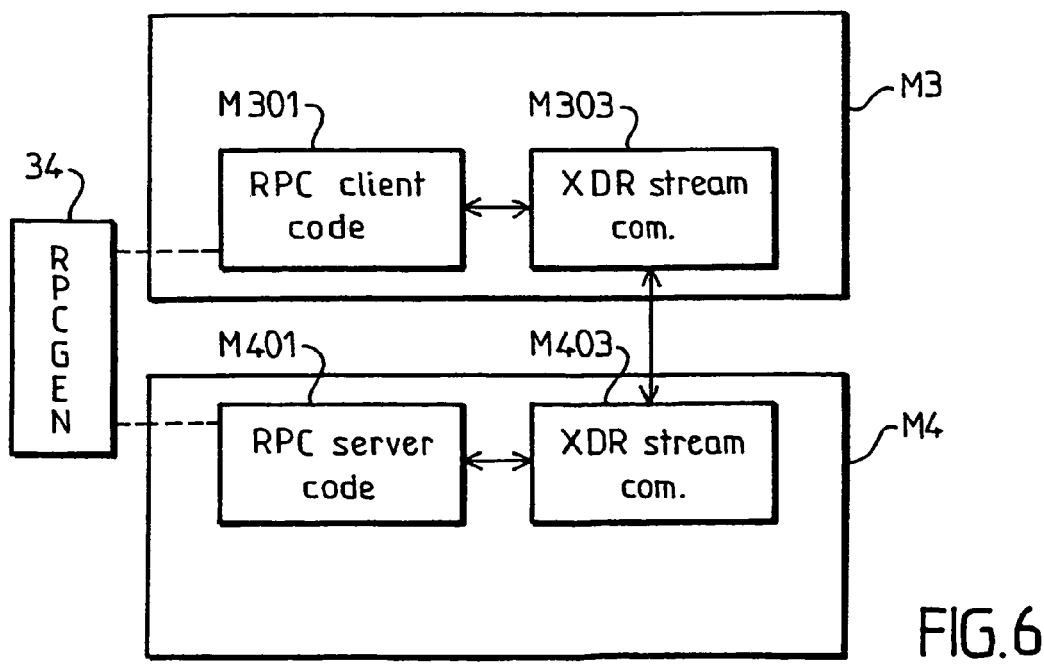

Now with reference to FIG. 6, both stations M3 and M4 use C or C++, e.g. via Solaris or ChorusOS (both SUN operating system products). They may communicate with each other by means of the Remote Procedure Call (RPC), which is C-based technology that again may be used to build systems consisting of more than one program, potentially on more than one machine. RPC is available on a wide variety of platforms and with a clearly understandable C interface.

RPG is used by defining remote programs, each containing a number of procedures. A language called RPC Language may be used for this definition. The RPC language is specified inter alia in RFC 1831.

ftp://ftp.isi.edu/in-notes/rfc1831.txt.

A tool 34 called rpcgen (in SOLARIS and other Unix-like OS products) takes RPC language and generates C code for clients M301 and/or servers M401 for the procedures. Creating an RPC server then just necessitates filling in the C functions whose prototypes are emitted by rpcgen.

An RPC procedure has parameters and a return value. These can be of a number of different types: primitive types, such as integers and strings, structures and arrays composed of these, discriminated unions (a CASE structure), and "pseudo-pointers", used to transmit non-cyclic data structures such as inked lists. Different RPC programs, and different procedures within those programs, are distinguished from one another by programmer-supplied numbers. Part of the RPC subsystem on a server can look at the program and procedure numbers, as specified in an incoming RPC call, and send that call to the appropriate C function.

RPC uses a standard called XDR (eXternal Data Representation) to transmit data in an architecture-neutral form. An XDR stream does not contain any information about the types of the data being transmitted. The sender XDR module M403 and the receiver XDR module M303 are supposed to have agreed about this, typically by being initialized in accordance with the same RPC Language definitions.

ftp://ftp.isi.edu/in-notes/rfc1832.txt, and/or in the corresponding printed documentation.

Figure 8:
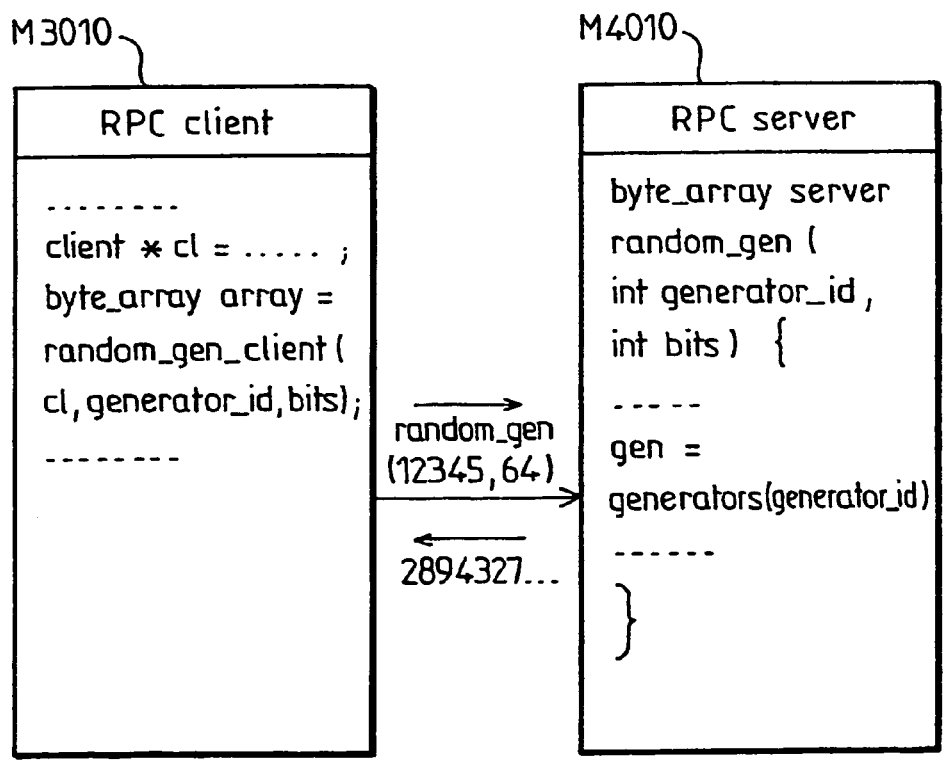

An exemplary RPC connection between a client M3010 and server M4010 is shown in FIG. 8. Both include C language code, the skeleton of which is shown. The example may be viewed as the RPC equivalent of the above described RMI request. It may be noted that, as passed from the client to the server, the request includes not only the parameter 64, but also a generator_id parameter (here 12345) to identify the object being accessed.

The C language may manipulate data structures, which are sometimes called "C objects". Such a C object has no associated methods. In fact, a C object is basically anything the address of which can be obtained e.g. by using the well-known & operator. By contrast, objects in Java (and other object oriented languages) may have methods that can be invoked on them. In this specification, the expression (software) object refers to an object which may have methods.

As noted, interaction may be needed between two such different inter-process communication tools. The existing approaches will now be considered.

The Java Native Interface (JNI) may be used as a bridge between the Java and C (or C++) languages. However, the JNI approach relies on C-code modules, which have to be separately compiled. It lacks flexibility.

The so-called CORBA approach offers two other solutions:

the Interface Definition Language (IDL), which enables to define code e.g. in part for Java, in part for C or C++, however only when designing a completely new application;

the so-called RMI/IIOP bridge (IIOP stands for Internet Inter-ORB Protocol), which may offer a transition between the Remote Method Invocation (RMI) and an Object Request Broker (ORB), which, in turn, may communicate with applications written in C or C++ language.

However, mapping from IIOP to C is very demanding in terms of platform infrastructure, for its own implementation together with the voluminous libraries it requires.

http://www.omg.org/technology/documents/formal/corbaiiop.htm, and http://java.sun.com/j2se/1.3/docs/guide/rmi-iiop/index.html, and/or in the corresponding printed documentation.

This invention offers another approach, which has various aspects, at least partially independent from each other. More specifically, the detailed description will refer to Java and to C. However, the references to Java or RMI and to RPC or C/C++ in this description are only exemplary, and intended for ease in understanding: wherever applicable, It is felt desirable to avoid manipulating too long expressions in the foregoing description. To this effect, the following abbreviated notations are defined:

"lang1" designates a first programming language, which may be object oriented, e.g. Java;

"lang2" designates a second programming language, which may be conventional, e.g. C or C++, or any precursor language, like the RPC language, which may be then converted into C code, using e.g. the above mentioned rpcgen tool; in this specification, "C/RPC" designates the couple of C (or C++) language with its precursor, the RPC language;

where required for clarity, "lang20" designates the precursor language e.g. RPC, while "lang21" designates the second language itself, e.g. C;

"cis1" designates an inter-process communication within lang1, e.g. true RMI within Java, as shown in FIG. 5;

"cis2" designates an inter-process communication within the lang2, e.g. true RPC within C, as shown in FIG. 6;

"trans1" designates an inter-process communication between a client process within the lang1 world and a server process within the lang2 world;

"trans2" designates an inter-process communication between a client process within the lang2 world and a server process within the lang1 world.

For clarity purposes, detail features will have to be described hereinafter in the Java and C/RPC context. This does not include any intended limitation to Java as a first language and to C/RPC as a second language. Accordingly, even where the above abbreviations are not used, Java/RMI should be understood to mean "first language", while RPC/C/C++ should be understood to mean "second language", unless otherwise indicated or suggested by the context.

In one of its aspects, this invention proposes a mapping between software objects in lang1, and data structures in lang2. The data structure (also denoted struct hereinafter) in lang2 (C in the example), is represented by a so-called "struct-like" class in lang1 (Java in the example). Conversely, an object (structX1) instanciated from the struct-like class in lang1 may be represented by a data structure structX2 in lang2. This will be described hereinafter in more detail.

In itself, a struct-like class may be defined as a collection of data with no associated behaviour. Frequently it will have no methods, but this is not a requirement. This is similar to a struct in a language like C++ or CORBA IDL. In the case of a first language like Java, which does not have struct as a separate concept, the general class mechanism may be used for generating struct-like classes.

A structX1 object will usually have methods. In accordance with another aspect of this invention, each such method methX1 is converted into a program or process proX2 in lang2 (the second programming language).

Thus, the lang2 counterpart of a structX1 object may now comprise:

a definition of the structX2 data structure adapted for representing the structX1 in lang2, for each method MethX1 of structX1, a procedure proX2 in lang2, comprising procedure code procodeX2 converted from the lang1 code MethcodeX1 of method MethX1 into lang2, a procedure proX2 in lang2 may also have a procedure parameter proparaX2 representing the data structure structX2.

One reverts now the example where lang1 is Java and lang2 is C. Java methods are invoked on objects. In Java, a method may refer to the object containing it by a "this" keyword. C language procedures have no such context. In Java RMI, we may refer to the remote object containing the remote method as "Remote_this", when viewed from the RMI client.

The additional parameter proparaX2 inserted e.g. at the beginning of the parameter list of a generated proX2 procedure, may be viewed as providing a Remote_this, on which the method is being invoked in Java, and refers to the data structure structX2 corresponding to object structX1.

In accordance with still another aspect of this invention, provision is made for a communication tool between languages, enabling a first process (MethX1) to call a second process (proX2), while passing software objects, and/or conversely, if desired. A bridge is defined between the respective communication tools of lang1 and lang2, or one of these communication tools (e.g. in lang1) is rewritten to accommodate the other one (e.g. in lang2). This may maintain communication-level compatibility with the cis1 and/or cis2 inter-process communication tools.

In accordance with still another aspect of this invention, there is provided a Remote interface, from lang1 (e.g. Java) to lang2 (e.g. C), or conversely. Optionally, such an interface may be lang1 oriented, or lang2 oriented. This will now be explained in the example of the sense Java to C, without any limitation to these languages:

a. the Remote interface may inherit from the "normal" Java RMI interface (Java.rmi.Remote), thus offering a great amount of the possibilities of RMI in Java. This is named here "RMI-over-RPC" (lang1-over-lang2).

b. the Remote interface may alternatively inherit from a "special" Java interface (SingletonRemote), e.g. to provide access to pre-existing RPC servers. This is named here "RPC-through-RMI" (lang2-through-lang1). The "special" Java interface (SingletonRemote) may be a sub-interface of the "normal" Java RMI interface (java.rmi.Remote). The SingletonRemote interface is a marker interface that indicates that the RPC server has only one object implementing that interface, so there is no need to identify a "remote this".

In each of the above cases, if language-level compatibility with "true RMI" is desired, every method declared in a Remote interface should include java.rmi.RemoteException in its throws clause; every superinterface that also inherits from java.rmi.Remote should also respect this condition.

Figure 9:
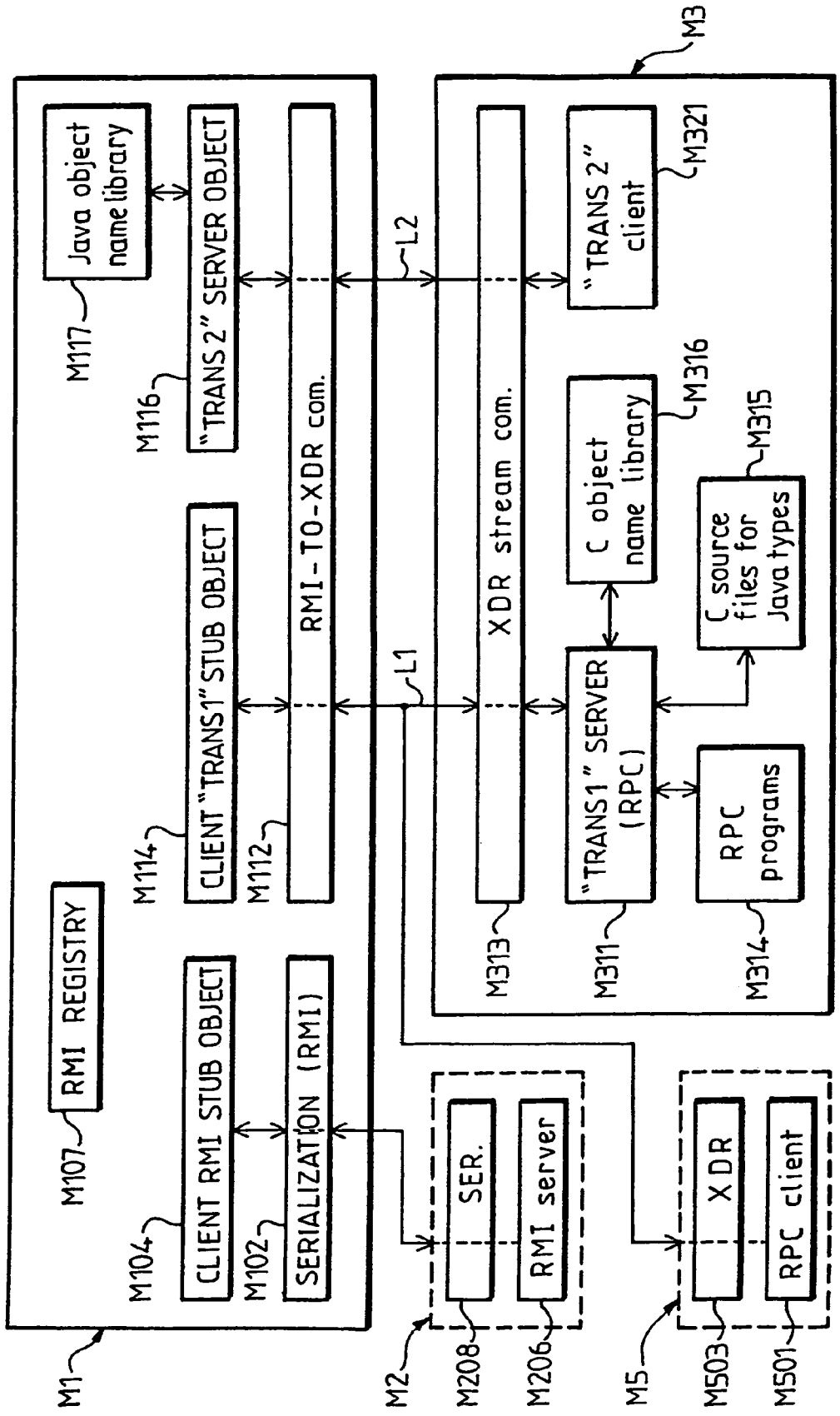

An exemplary embodiment is shown on FIG. 9:

1. On the lang1 (e.g. Java) side, machine or process M1 may include the same "cis1" components as in FIG. 5, if desired. This may comprise stub object M104, whose RMI communication actions are sent to a "cis1" communication module M102 (using e.g. Java serialization, i.e. conventional or "true" RMI). At the other end, in machine M2, serialization M208 recovers the communication actions, and delivers them to "cis1" server M206, according to the RMI protocol.
2. In accordance with this invention, machine M1 comprises "trans1" stub objects like M114. It may additionally comprise a "trans2" server object M116.
3. On the lang2 (e.g. C) side, in accordance with this invention, machine or process M3 may include "trans1" server M311. It uses RPC programs M314 in C code (these programs may also be within server M311, totally or partially). Machine M3 may also include C source files for Java types M315 and/or a C object name library M316. Machine M3 may additionally comprise a "trans2" client M321, for communication with "trans2" server M116 in machine M1.
4. An interconnection is provided between trans1 communication actions (e.g. calls) on the lang1 side and trans1 communication actions (e.g. call transmission) on the lang2 side. In the example, the interconnection is on the lang1 side. It comprises a RMI-to-XDR (bi-directional) function M112, located in machine M1, and communicating over a link L (split into L1, L2 for convenience) with e.g. machine or process M3.
5. In this example, since the bi-directional RMI-to-XDR conversion is located on the lang1 side, the XDR stream communication module M313, on the lang2 side, is left unmodified. Accordingly, the link with XDR stream communication module M313 may also go to a machine M5, having its own XDR stream communication module M503, and "cis2" client M501 (e.g. like RPC client M301 in FIG. 6).

Those skilled in the art know that serialization is a way to transmit Java objects. RMI builds on serialization to add a way to transmit method requests, where the parameters and return values from such requests may be Java objects.

On another hand, XDR may be viewed as a way to transmit data objects. RPC builds on XDR to add a way to transmit procedure calls (which are like method calls except that they are not invoked on a particular object). The parameters and return values from these calls are data objects.

In this invention, the bi-directional RMI-to-XDR conversion function M112 may operate as follows:

on the lang1 side, the interface of function M112 imitates the way the RMI protocol works with the Java serialization;

in itself, module M112 uses code that communicates using RPC, instead of code that communicates using the conventional RMI-serialization communication.

To sum up, the "trans1" interface may be represented in lang1 by a "trans1" client stub object M114, linkable to "trans1" server module M311. Each "trans1" stub like M114 implements the methods in its Remote interface (class), such that calling a method on "trans1" stub object M114 will cause "trans1" server M311 to execute the appropriate procedure in the appropriate one of the programs in M314. The "trans1" stub object M114 sends method's parameters through serialization module M102 and RMI-to-XDR module M112, in Machine M1, then through XDR module in machine M3. If any, the return value (or the generated exception) may be sent back through modules M313, M112 and M102, and translated back into Java after the call, in the Java client stub M114.

One may also have to take into consideration differences of behaviour between the basic communication tool in lang1, e.g. Serialization, and the basic communication tool in lang2, e.g. XDR. In the example, XDR cannot deal with inheritance (when the actual type of a parameter is a subclass of its declared type), and it cannot deal with the arbitrary serialization of Java objects with its readObject and writeObject methods. This will be discussed further below.

With the above described system, Java clients like M114 may be linked to legacy C programs, like M314, with the Java access being closely similar to standard Java RMI, e.g. M104. This makes it possible to benefit the vast number of existing C programs. Furthermore, the legacy C programs can subsequently be replaced by Java programs accessed through RMI, and almost no work is required to adapt the Java client. Conversely, if desired, C clients like M321 may communicate with Java servers like M116. Of course, the above may apply as well to a first language (lang1) other than Java, and to a second language (lang2) other than C.

Continuing in the exemplary case of Java and C, the very simple code example of FIGS. 7 and 9 may now become as shown in Exhibit E2, in which:

section E2-1 shows the Java code for the random class, for use in "cis1" stub M104 of FIG. 9 and in its "cis1" server M206;

when compiled, the Java random class may be converted into an RPC language definition file, named e.g. random.x, shown in simplified version at E2-2; this is used to generate the C code for "trans1" server M311 in FIG. 9;

section E2-3 shows a Java RPC stub class also generated from Random.class, for use in "trans1" stub M114 in FIG. 9;

optionally, one may also generate an RPC server in Java, callable by remote C programs, as shown at E2-4, for use in "trans2" server M116 in FIG. 9.

Figure 10:
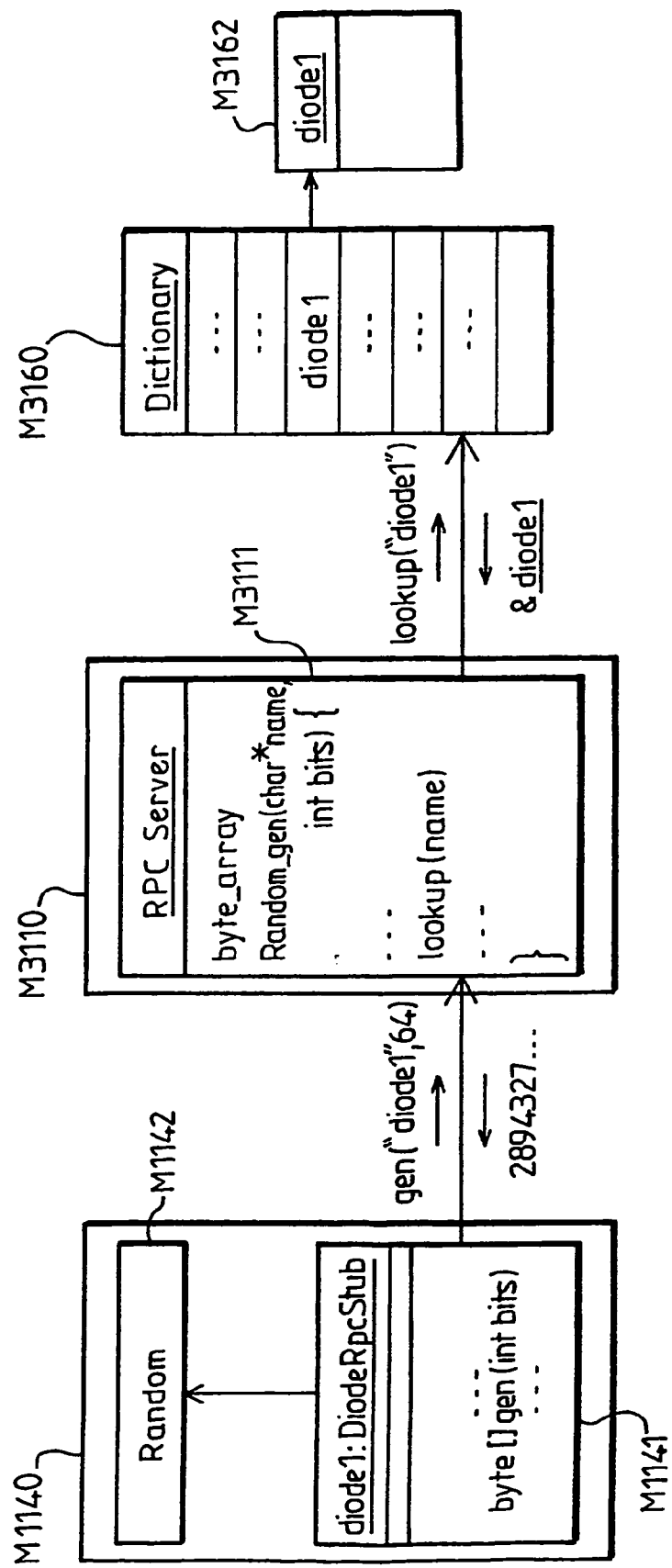

The above may be represented by the diagram of FIG. 10, in which the "diode RPC stub" Java client M1140 corresponds to the "diode stub" Java client M1040 of FIG. 7. Both objects offer the same interface to their users in 1042 and 1142, namely the interface Random. However, the code implementing the interface does RMI/serialization communication in the case of M1040, while it does RPC/XDR communication in the case of M1140.

By contrast, the "trans1" server M3110 for "trans1" client stub object M1140 now has C code, comprising, at M3111:
byte_array Random_gen(char*name, int bits)

Those skilled in the art will recognize a C language equivalent of the Java instruction within object M1141.

FIG. 10 also shows an implementation M3160 of library or dictionary M316 of FIG. 9. In the example, process M3110 has to return object diode1. For so doing, its code includes e.g a lookup(name), where name is the parameter of the random_gen() function, i.e. diode1. The lookup interrogates the dictionary M3160. The dictionary has information about the data structure diode1, as shown at M3162; it may therefore return & diode1, i.e. the address of the data structure (or C object) diode1, to process M3110.

More generally, library or dictionary M316 of FIG. 9 maps between the address of a "C object" or data structure, and an external reference to that "C object". This makes it possible to export "C objects" remotely.

Incidentally, where a Java trans2 server M116 is implemented (FIG. 9), a similar Java object name library M117 may be used on the Java side, to "export" Java objects into C data structures or C objects.

Now reverting to the trans1 case, when a C object may have to be seen from outside a C program M314 (like an exported RMI object in RMI), it should be registered with library M316 (FIG. 9). C code M314 may have to operate e.g. on an object specified by a remote caller, whether as the "remote this" parameter of a translated RMI method, or as another Remote parameter; if so, C code M314 uses library M316 to find the address of the corresponding C object. Conversely, C code M314 may have to return to a remote caller a reference to an object; code M314 then uses library M316 to translate from the address of the C object into its remote representation.

The library enables the "trans1" server M311 (e.g. in C) to take the "remote this" remthisX1 it is given as the first parameter proparaX2 of a procedure proX2 corresponding to a Java method methX1 and find a corresponding C object remthisX2. The same action is done for other parameters that are Remote interfaces in the Java method. Also, the "trans1" server may have to do the reverse translation: taking a C object remthisX2 and converting it into a remotely-understandable reference in lang 2, that can subsequently be used in a "cis2" Remote Procedure call to refer to that object.

Library M316 may also serve to give the remote client M114 a list of the objects currently exported by a C program, or the subset of those objects that correspond to a given Remote interface. For instance, this allows a JMX-compatible MBean server in machine M1 to create for each exported object an MBean (acting as "trans1" client M114) that forwards methods on the object to the C process execution.

A reference to a remote object may have a number of different forms, two of which will be described by way of example:
in a version, a remote object reference may be represented as a triple of integers (index,generation,type). The index and generation are eternally-opaque values used by the C library to find the object. The type may be examined by the client (M114) to find out what sort of object it is.

Another thing the client may do with a remote reference is to pass it back to the process it came from, as a "remote this" or other argument.

alternatively, a remote reference may be a string, with semantics mostly undefined by the library M316. This may make it easier to write C clients (like M501, FIG. 9) of the "trans1" server M311. Another advantage is that it is possible to include in the string some identifier of where it came from. This information may be used to allow references to be used by Java and even C code, without regard to their origin.

Unlike true RMI, the library M316 does not know whether remote references to a local object exist. Thus, it cannot garbage-collect. If garbage collection is desired, part or all of the following features may be applied:
a "trans1" server like M311 may explicitly unregister a remotely registered object when it is no longer valid.
If a "trans1" client like M114 has a remote reference to the object and later tries to use it, the translation to a local C object within the "trans1" server M311 will fail.
to help in solving this problem, the library M316 may emit events on object creation and deletion.

The primitive types of lang1 may be converted or "mapped" in lang2 (or lang20) according to predefined rules. An example of such rules is illustrated in the upper portion of the table shown in FIG. 12, with lang1 being Java, and lang20 being the RPC language.

A tool (program) may be used as an aid in preparing the required lang1 and lang2 (or lang20) code. For convenience, this tool may be referred to hereinafter as "RMI2RPC" (for "RMI to RPC"). The name RMI2RPC does not include any intended limitation to Java (RMI) as a first language and to RPC and/or C as a second language.

The RMI2RPC tool may take a lang1 (e.g. Java) class (or a list of such classes) as an input. Normally, each class is either a Remote interface (e.g. a subinterface of java:rmi.Remote in Java), or a data type to be translated from lang1 (Java) into lang 2 or lang20 (RPC Language). One may also use "analysers", to be described hereinafter.

Figure 11:
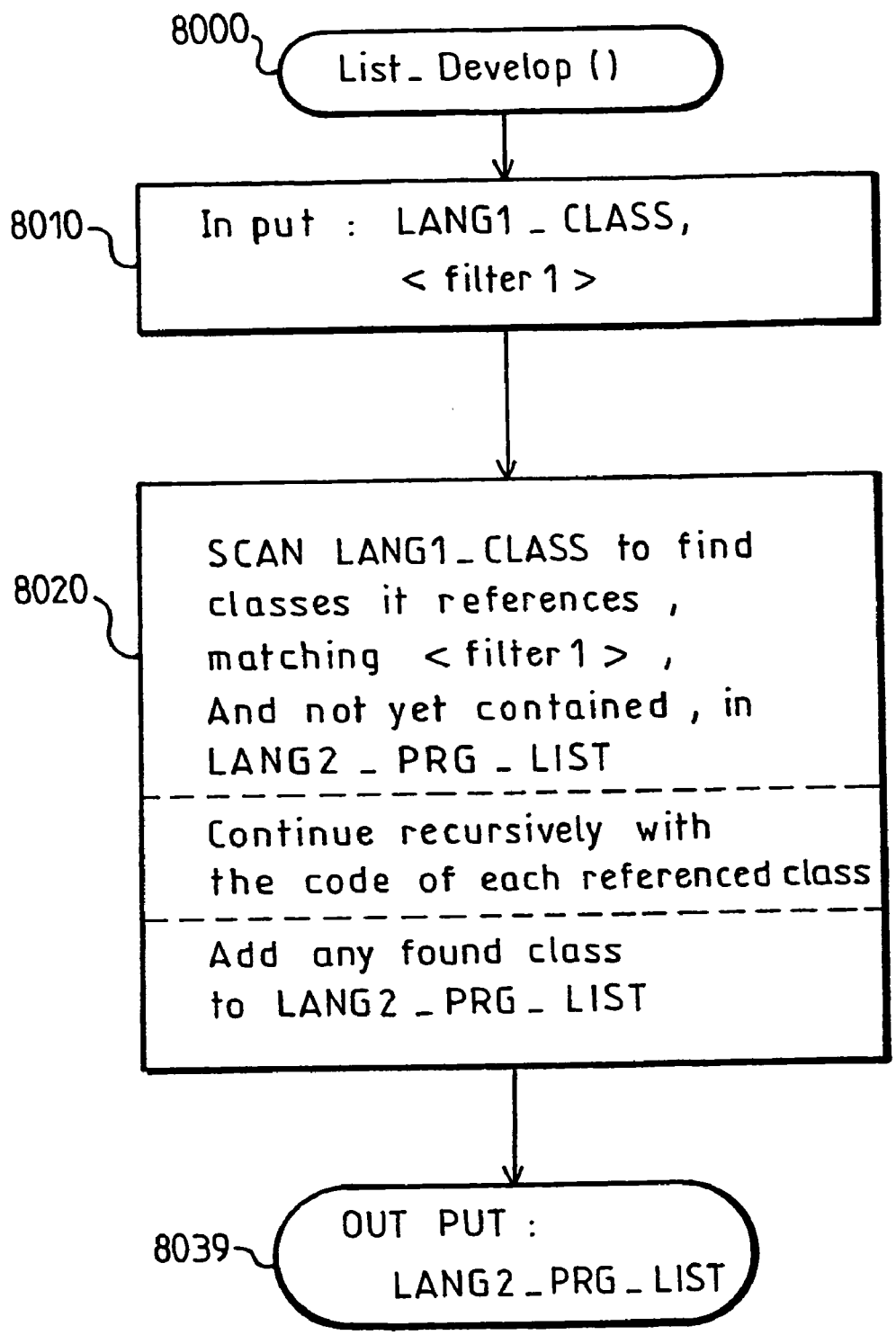

The RMI2RPC tool will first convert the input into a developed list, using e.g. the flow chart of FIG. 11, which defines a mechanism or function 800, called e.g. List_Develop() for convenience. The above mentioned input is noted LANG1_CLASS at 8010; it may be accompanied with a parameter noted <filter1>, and defining a filtering condition, e.g. in the form of a character string. An empty list LANG2_PRG_LIST is initialized ; it will serve as an output.

The main action is defined by operation 8020. Basically, LANG1_CLASS is scanned for finding classes it references, matching the condition defined by <filter1>, and being not yet contained in LANG2_PRG_LIST. This is done not only with LANG1_CLASS, but also continued recursively (and iteratively) for each referenced class (e.g. at its first occurrence). Any class newly found during this process is added in LANG2_PRG_LIST (newly found includes not yet present in LANG2_PRG_LIST).

This is continued until the initial LANG1_CLASS and all classes it references, directly or indirectly, have been completely scanned. Finally, at 8039, the output is a list LANG2_PRG_LIST containing the input LANG1_CLASS, plus all classes being directly or indirectly referenced in a class belonging to LANG1_CLASS.

Operation 8020 may comprise scanning the source code of each class, and/or using class inspection tools, like the "reflection" of Java.

This type of algorithm is generally known as a "transitive closure algorithm". More sophisticated examples may be used, e.g. as described in "Introduction to Algorithms", Thomas H. CORMEN, Charles E. LEISERSON, Ronald L. RIVEST, MIT, Mc Graw Hill, 1989, pages 562+.

In fact, additional filtering conditions may be applied, in operation 8020, when deciding to add a class in the list, for example a condition <filter1> specifying that the class being searched must be a "struct-like" class. For illustration purpose, such conditions may be viewed as supplemental parameters passed to the List_Develop() function, e.g. as follows:

List_Develop(<input_class>, <filter1>, <filter2>, ... ))

The internal operations shown in FIG. 11 may be adapted to apply the filtering conditions like <filter1> and <filter2>. For example, <filter1> may be the condition for scanning classes being referenced, recursively, while only those of the classes matching <filter2> are added in LANG2_PRG_LIST.

The above uses the concept of a "referenced" class, which may be defined as follows, in the example of Java: a class X references a class Y if one or more of the following hold:

Y is a superclass or superinterface of X, or

X has a field of type Y, or

X has a method with return type Y, or

X has a method with a parameter of type Y, or

X has a method that can throw an exception of type Y.

More generally, a class X references a class Y if X inherits from Y (directly or indirectly), or if X has a member (field or method) which involves Y. This may apply to lang1 languages other than Java.

The List_Develop() function of FIG. 11 may receive a list as an input, in which case the process is repeated for each input class in the list. The results may be delivered as a list array, or concatenated in a single list, for example.

Figure 13:
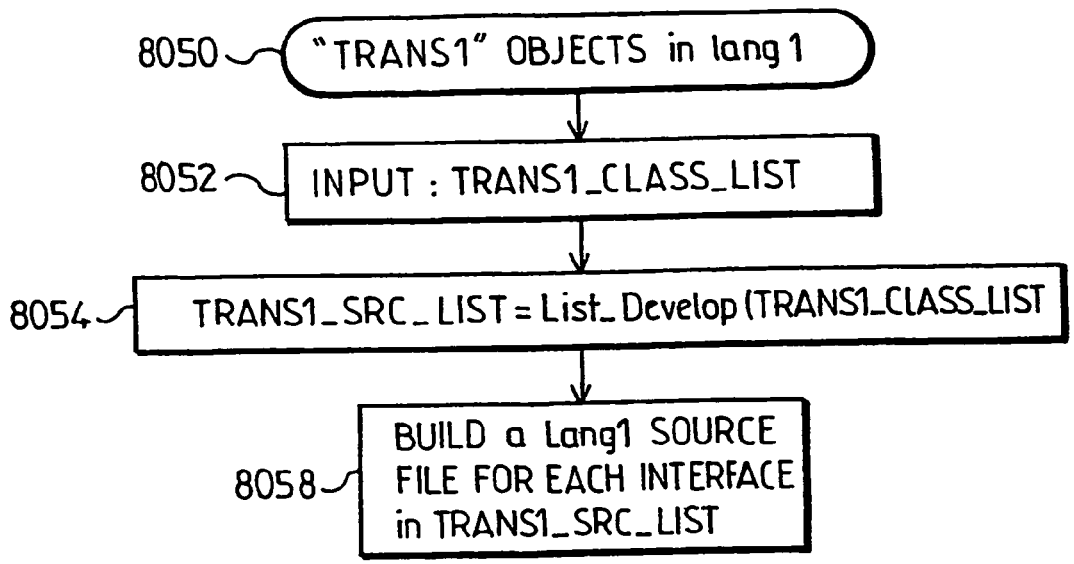

FIG. 13 shows, starting at 8050, the generation of "trans1" objects for use in lang1. At 8052, the input is a list, e.g. named TRANS1_CLASS_LIST. Normally, this is a list of remote interface names in lang1, including e.g. the Random.class shown at E2-1 in Exhibit E2.

Operation 8054 is a processing similar to the one of FIG. 11, which expands the input list TRANS1_CLASS_LIST into a developed list TRANS1_SRC_LIST as follows: each Remote interface (trans1_item) in TRANS1_CLASS_LIST, and also each Remote interface referenced in a trans1_item is added in TRANS1_SRC_LIST, until all trans1_items in TRANS1_CLASS_LIST have been seen. This is applied recursively, i.e. a remote interface referenced in a trans1_item is in turn explored to find remote interfaces it references. A trans1_item also references its parents, i.e. a superinterface in Java.

The processing of operation 8054 is summarized in FIG. 13 by a call to the function of FIG. 11. The filter parameter (not shown) may be an expression meaning "the class is a remote interface".

Then, at 8058, a lang1 source file is built for each interface in TRANS1_SRC_LIST.

Each lang1 source file will serve to create a "trans1" client stub (M114) for the corresponding interface. The "trans1" client stub M114 is equivalent to the "cis1" client stub M104, described above with reference to FIG. 9.

For example, from the Random.class shown at E2-1 in Exhibit E2, the mechanism of FIG. 13 will generate the RPC stub class code shown at E2-3.

This will be discussed in more detail hereinafter.

Figure 14:
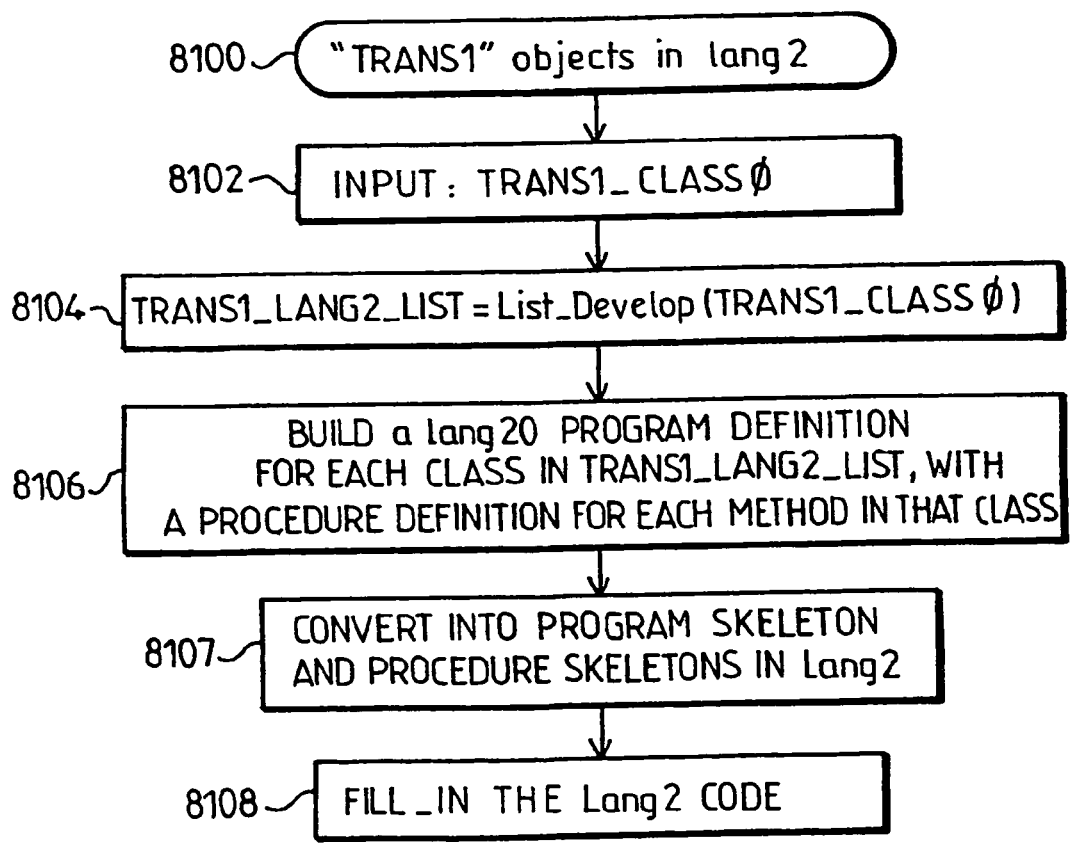

FIG. 14 shows, starting at 8100, the generation of "trans1server"code, for use e.g. as M311 (FIG. 9).

At 8102, the input is a list, e.g. named TRANS1_CLASS0. Although the list may comprise several lang1 classes, it will be assumed for the moment it contains a single lang1 class. This single class may be e.g. the Random.class shown at E2-1 in Exhibit E2.

Operation 8104 is a processing similar to the one of FIG. 11, which expands the input list TRANS1_CLASS0 into a developed list TRANS1_LANG2_LIST as follows. Assuming TRANS1_CLASS0 contains a single class (trans1_item), the last is put in first position in TRANS1_LANG2_LIST. Then, each class referenced in trans1_item is added in TRANS1_LANG2_LIST. This is applied recursively, i.e. a class being referenced becomes in turn a trans1_item, which is in turn explored to find classes it references.

The processing of operation 8104 is summarized in FIG. 14 by a call to the function of FIG. 11. The filter parameter (not shown) may be an expression meaning "the class is a remote interface".

Then, at 8106, a program definition (e.g. an RPC program definition) in the precursor language Lang20 (or directly in lang2) is built for each class being listed in TRANS1_LANG2_LIST. Each program definition contains a procedure definition (e.g. an RPC procedure definition) for each method in the class it addresses. The program and procedure definition define what the operations are, i.e. the interface, as known e.g. from those skilled in using RPC language.

At 8107, the code in lang20 is converted into program skeletons and procedure skeletons in lang2. may be filled in, e.g. by hand. Then, at 8108, the skeletons lang2 may be filled in, e.g. by hand, to obtain a complete program code. In the case of lang20 being RPC, the conversion tool may be the above mentioned rpcgen.

Now, if a list of input classes is to be processed, it is treated repetitively as described above, class by class, such that each lang2 program includes procedures for the classes it references. Alternative ways of doing this may be used, for example using a "Directed Acyclic Graph" (DAG) whose first levels would be the "TRANS1_CLASS0" classes, and sublevels would include the classes being referenced in each "TRANS1_CLASS0", directly or indirectly.

Thus, each lang1 Remote interface is translated into a lang20 program, and each method in such an interface is translated into a lang20 procedure in the program. In more detail, lang2 types and constants are generated, as needed by the procedures, or corresponding to non-Remote classes in the lang2 file for M314.

In the Java/RPC example, calls to methods in the "trans1" client stub are translated into the RPC protocol so they can be sent to a "trans1" RPC server written in C, based on the generated RPC Language description.

Figure 15:
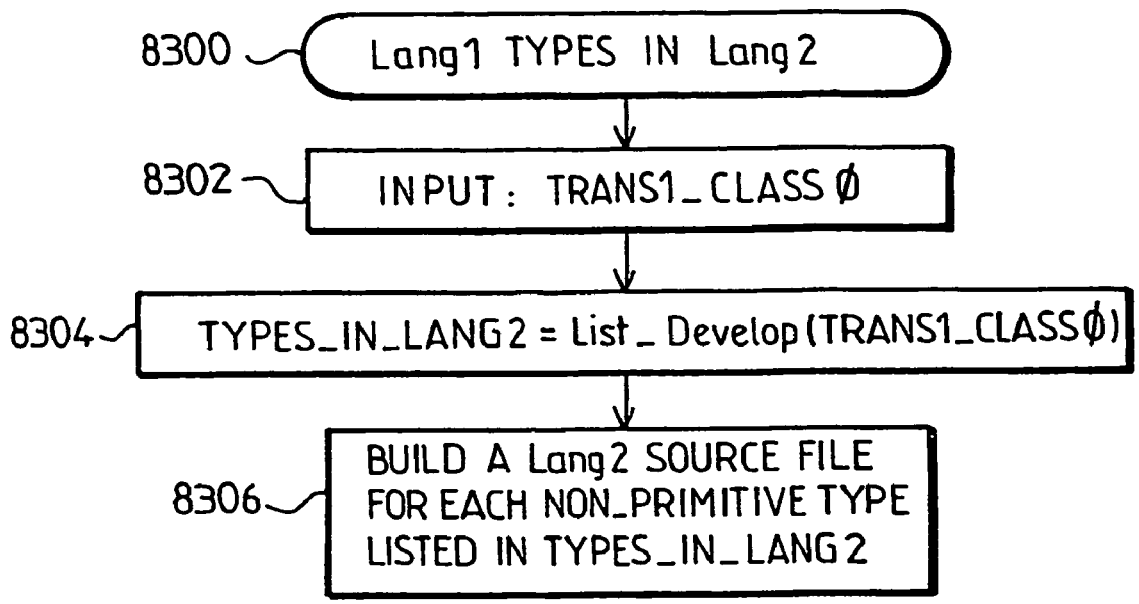

FIG. 15 shows, starting at 8300, the generation of one or more lang2 files for use e.g. in M315 (FIG. 9). These lang2 files will describe lang1 types, which have to be known in lang2. The lang2 source files allow a "trans1" server to know about the lang1 types corresponding to the lang2 programs it has (in the Java/RPC example, C source files M315 will allow an RPC server M311 to know about the Java types corresponding to the RPC programs M314, in particular to know whether one Remote interface is a superinterface of another).

At 8302, the input is a list, e.g. named TRANS1_CLASS0. Here, the list may comprise one or more lang1 classes, e.g. the Random.class shown at E2-1 in Exhibit E2.

Operation 8304 is again a processing based on the one of FIG. 11, which expands the input list TRANS1_CLASS0 into a list TYPES_IN_LANG2, containing the lang1 types (other than primitive types) which have to be known in lang2, i.e. basically the remote interfaces, and their superinterfaces. Again, referenced classes a recursively considered.

The processing of operation 8304 is summarized in FIG. 14 by a call to the function of FIG. 11. The filter parameter (not shown) may be an expression meaning "the class is a remote interface".

Finally, at 8306, a lang2 (e.g. C) source file is built for each non primitive type listed in TYPES_IN_LANG2. These files will describe the parents and children of each remote interface. The "reflection" mechanisms of Java may be used to know the inheritances between the Java classes, and to build a representation of these, using e.g. tables and/or a Directed Acyclic Graph representation.

Figure 16:
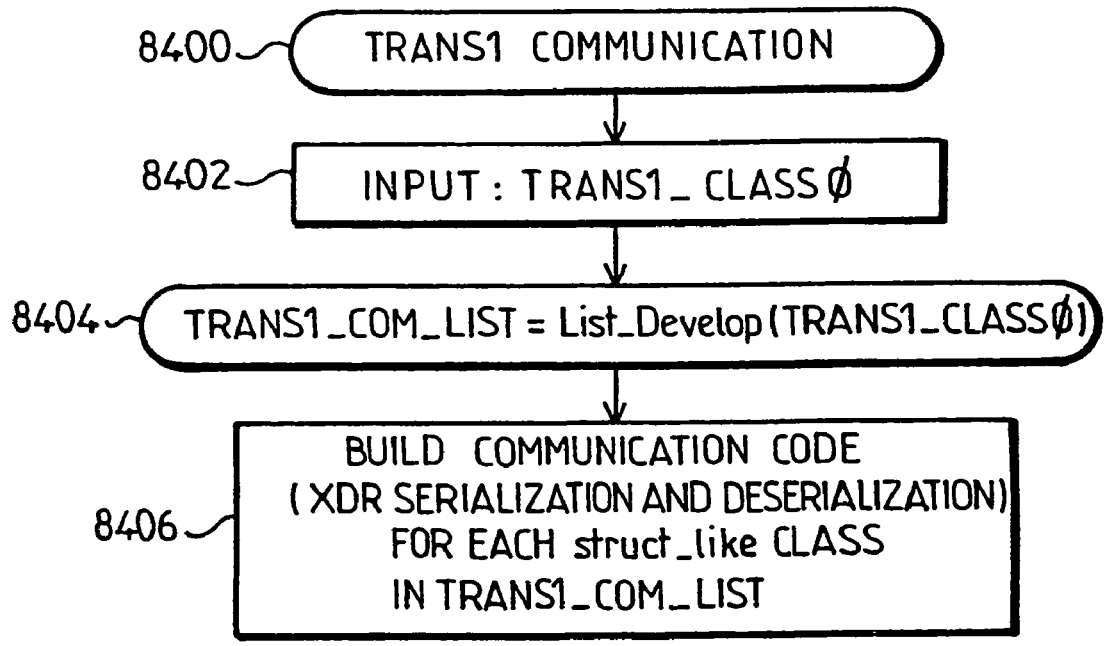

FIG. 16 shows, starting at 8400, the generation of code for the trans1 communication XDR serialization and de-serialization code in the example). Operations 8402 and 8404 are similar to 8052 and 8054 (FIG. 13). However, the resulting list in 8404, named TRANS1_COM_LIST, will be restricted to the struct-like lang1 classes.

The processing of operation 8404 is summarized in FIG. 15 by a call to the function of FIG. 11. The filter parameter (not shown) may be an expression meaning "the class is a struct-like class".

Operation 8406 thereafter builds communication code for each struct-like class in TRANS1_COM_LIST, for use e.g. in M112, using rules in E1.3.

Figure 17:
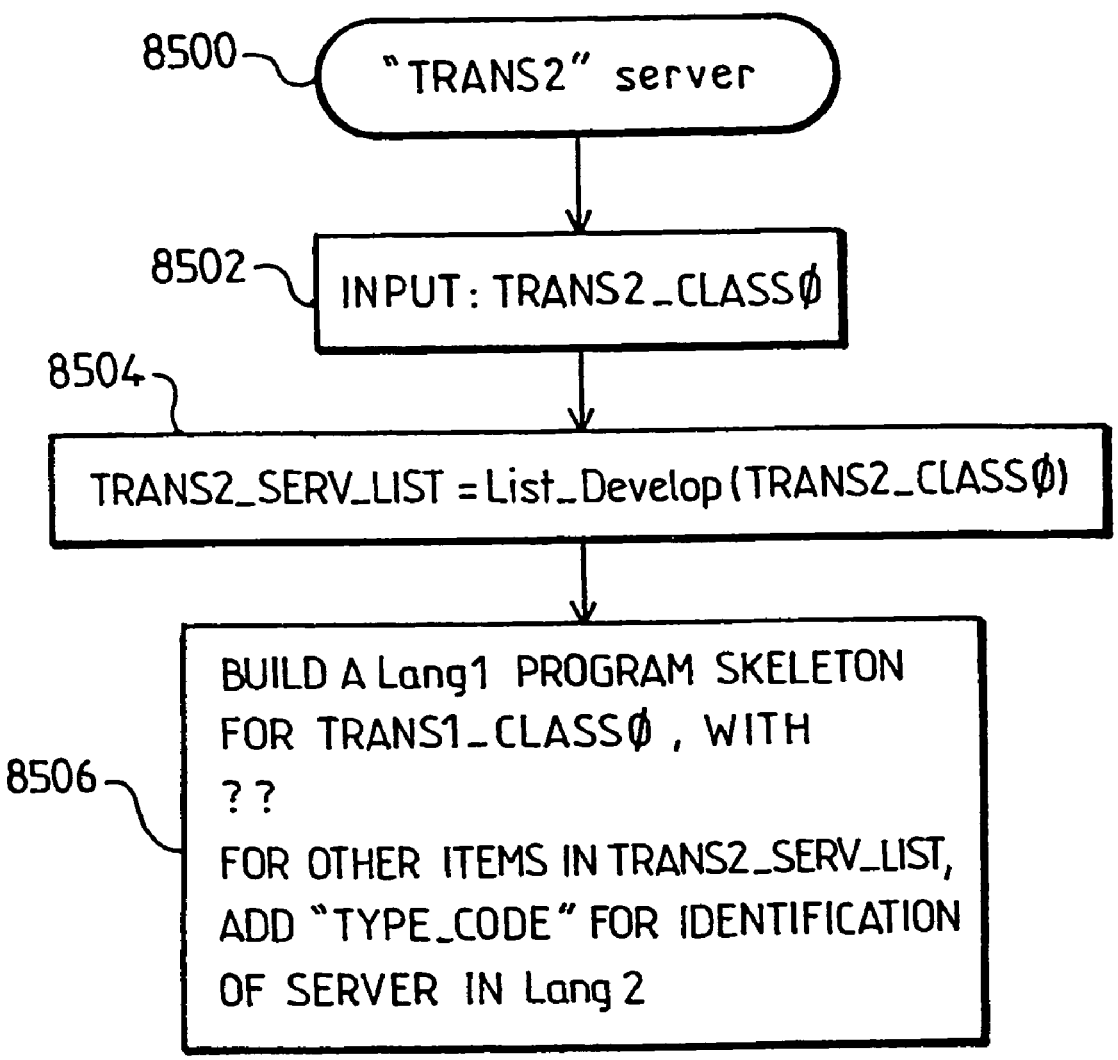

FIG. 17 shows, starting at 8500, the generation of "trans2" server code, for use e.g. as M116 (FIG. 9).

At 8502, the input is a list, e.g. named TRANS1_CLASS0. Although the list may comprise several lang1 classes, it will be assumed for the moment it contains a single lang1 class. This single class may be e.g. the Random.class shown at E2-1 in Exhibit E2.

Operation 8504 is a processing similar to the one of FIG. 11, which expands the input list TRANS1_CLASS0 into a developed list TRANS2_SERV_LIST as follows. Assuming TRANS1_CLASS0 contains a single class (trans1_item), the last is put in first position in TRANS1_LANG2_LIST. Then, each class referenced in trans1_item is added in TRANS2_SERV_LIST. This is applied recursively, i.e. a class being referenced becomes in turn a trans1_item, which is in turn explored to find classes it references. A trans1_item also references its parents, i.e. a superclass in Java.

The processing of operation 8504 is summarized in FIG. 14 by a call to the function of FIG. 11. The filter parameter (not shown) may be an expression meaning "the class is a remote interface".

Then, at 8506, a program skeleton in lang1 (e.g. Java) is built for the initial class TRANS1_CLASS0. The program skeleton contains in fact a class corresponding to the input interface TRANS1_CLASS0, as shown in E2-4, where the class name is "RandomServ". A program number, named e.g. type_code is added as a class member, with the value 1195528291 in code example E2-4. A version number may also be added.

The other classes in list TRANS2_SERV_LIST might be added as other classes in the program.

The program skeleton may be filled in, e.g. by hand.

Now, if a list of input classes is to be processed, it is treated repetitively as described above, class by class, such that each lang1 program includes calls for the classes it references.

In this way, a "trans2" server object in Java may be built for each Remote interface in the list of classes (for use e.g. in M116, FIG. 9).

This invention may also use analyzers, or type-translation plug-ins as described in E1.9. These are text string handling functions, adapted to recognize a portion of a program text in a language (e.g. a .class binary file), and to convert it into a corresponding portion of a program text in another language. Such functionalities are generally known to those skilled in the art, and may be readily implemented, after the rules of conversion have been defined. In this invention, with a view to reduce the task of filling in program skeleton by hand, such rules of conversion may be defined for the following program items:

primitive types;
interfaces;
struct-like classes;
if desired, one or more "NewClassFactory" (Analysed-ClassFactory). A list of these factories is maintained, and every class that needs to be translated is handed to each factory in turn until one of them accepts it, and does the translation.

Several other aspects of this invention will now be discussed in more detail, with reference to Java and C/RPC, where this is useful for clarity. Specific information relating to Java and RPC is attached as Exhibit E1. Again, this does not include any intended limitation to Java as a first language and to C/RPC as a second language.

Character encoding and "transmittable" fields are discussed in sections E1.1 and E1.2 of Exhibit1, respectively.

The "trans1" and/or "trans2" exchanges of data may be limited to "translatable types". As shown in FIG. 12, "translatable types" are basically primitive types, wrapped primitive types, String, or an array of any of these. In fact, FIG. 12 shows the mapping between Java and C, via RPC; the basic translatable types may be at least partially different when mapping a first language other than Java into a second language other than C/RPC, and conversely. In the case of FIG. 12, the translation of types may for example apply at least in part the rules indicated under E1.3.

As noted, this invention may also use "Remote interfaces", and/or struct-like classes, in Java or in a similar object-oriented language. If so, the "translatable" types may also comprise: Remote interface, and/or struct-like class, as shown in the lower portion of FIG. 12, or an array of any of these. It is noted that Remote interface and/or struct-like class are independent, and either or both may be supported.

Defining the "translatable" items may involve not only lang1 and lang2, but also the compared features of the communication tools, e.g. serialization in Java and XDR in C.

The translation of constants is now considered, it being noted that fields in a Java interface must be constant. Starting from FIG. 12, the translation of constants may for example apply at least in part the rules indicated under E1.3.

Before describing the struct-like classes in more detail in the Java example, a few other definitions are required:

an array of a type X may be defined as a Java array of one or more dimensions whose base type is X. For instance, since int is a primitive type, int[][][] is an array of a primitive type.

a wrapped primitive type is a type such as Integer object (e.g. from java.lang.Integer), that corresponds to a primitive type but qualifies as an object in the first language (Java).

Now, a struct-like class may be defined as a Java class (with single inheritance, i.e. not an interface), in which each "transmittable field" may be coded in lang2, and in its precursor lang20 if used. In the Example of Java and C/RPC, this may be obtained by each field of the struct-like class satisfying at least one of the following sub-conditions:

It is not transmittable (transient or static);
It is a primitive type such as int or boolean, or a wrapped primitive type, or a language interface like java.lang.String;
It is a Remote interface;
It is another struct-like class that preferably should not recursively include this one, except as explained in E1.5;
It is an array of any of the preceding types.

The struct-like class may inherit from a class defining the connection with the lang1 communication tool, e.g. the RMI input/output interface java.io.Serializable in the case of Java, which marks a class as being serializable using Java serialization. This gives compatibility with RMI.

The applicant company has observed that such struct-like classes, and the corresponding Java objects, are a very convenient tool for later translation into data structures in the second programming language, e.g. "C objects".

Figure 18:
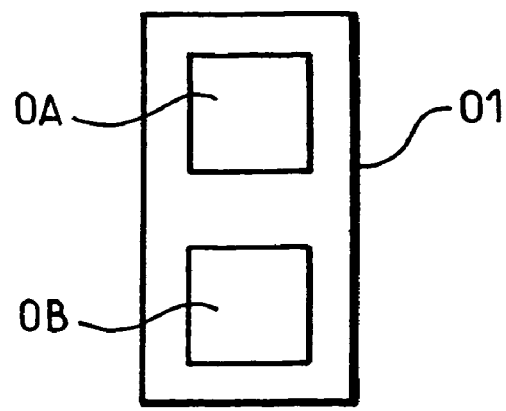
Figure 19:
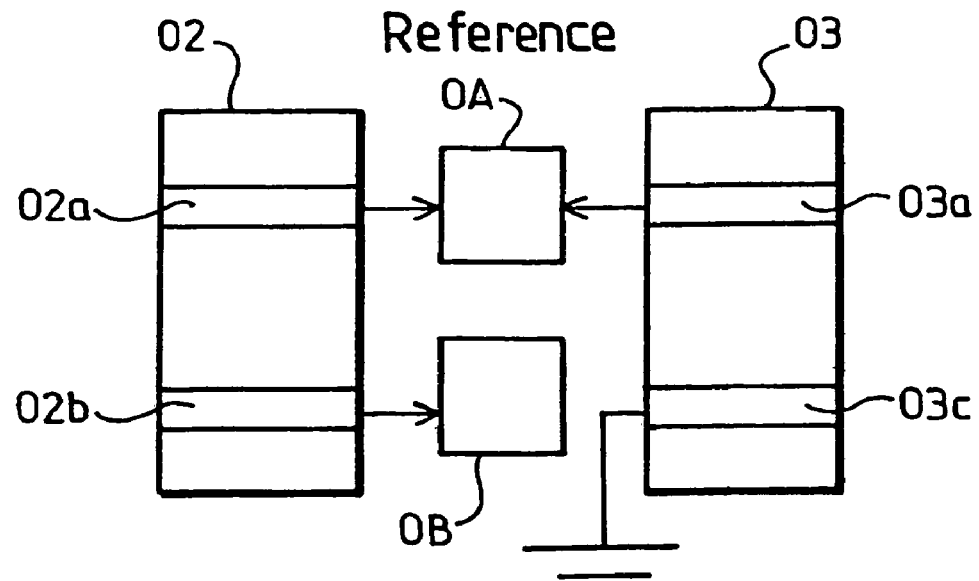

Other optional features of the struct-like class are listed in E1.6 Other detailed features of the object model are considered in E1.7, with reference to FIGS. 18 and 19. Exemplary naming conventions are described in E1.8.

The operation 8106 of FIG. 14 will now be described in more detail. Generally, each Remote interface input of lang1 is translated into an identified lang2 program. Each method in such an interface is translated into an identified procedure within this program. The methods in a Remote interface may be as follows:

each parameter should have a "translatable" type, as defined; and the return type should be void, or a "translatable" type, as defined; if the return type is a struct-like class, it should have an accessible no-argument constructor in lang1.

More precisely, in the Java/RPC example, a Remote interface is translated into an RPC (lang2) program declaration containing one RPC (lang2) procedure declaration for each method in the interface. Methods inherited from superinterfaces need not be translated since they will already have been translated in the RPC (lang2) programs for those superinterfaces. Example E2-2 in Exhibit 2 has only the main program Random_program, with a single procedure Random_gen. The type_code 1195528291 is associated with Random_program.

Each parameter in the method is translated into a corresponding RPC (lang2) procedure parameter, which may remain unnamed (see int bits). A "remote this" parameter is inserted before these parameters, of a type called "remote_object" (see remote_object_rem_this), whose definition appears at the beginning of the generated RPC Language file (lang2) (see typedef string remote_object<>). Alternatively, the RPC (lang2)procedure may have only one parameter, which in turn refers to a struct created specially to represent the above parameters (if multiple) in lang2.

The "remote_object" deals with the following problem: Java methods are invoked on objects, while RPC (lang2) procedures have no such context. Therefore, in accordance with an aspect of this invention, an additional parameter is inserted in the parameter list of each generated RPC (lang2) procedure, representing the "this" (or "remote_this")on which the method is being invoked.

However, the "this" parameter may be omitted in certain cases, e.g. where the Remote method inherits from the RMI-through-RPC class (com.sun.rmi2rpc.SingletonRemote), rather than java.rmi.Remote. This makes it possible e.g. to interface to existing RPC (lang2) services or to a bootstrap service that supplies a remote object on which methods can be invoked to access other remote objects. SingletonRemote is a subinterface of Remote, so a true RMI (lang1) object can also implement it.

Where a "remote this" is used in the lang2 server M311 (e.g. in an RMI-over-RPC interface), the constructor of the generated client stub M114 also has a second parameter, of type String which matches the "remote this" parameter to each RPC procedure on the other side. Those skilled in Java will recognize this in E2-3, in String remThis. This may also be used in the case of the "RPC-through-RMI" interface, if desired.

Similarly, when a called interface, e.g. M311 (FIG. 9), declares that it returns an object of a Remote interface type, the client stub, e.g. M114 (FIG. 9), will contain code to make an object implementing that type. The object may itself be another "trans1" client stub, based on the real type of the received object (which may be a sub-interface of the declared interface). The RPC procedure will return a String, which should contain enough information to be able to create a client stub of the appropriate type, whose Trans1Client is the same as that of the caller and whose "remote this" is the value just received.

In other words, a Remote interface type that appears as a parameter or return type to a method in a Remote interface being translated is converted into a "remote this" that allows conversion between a "trans1" client stub implementing the interface (in the Java world) and a pointer to a corresponding object in the RPC server (in the C world). This will be explained further below.

Although the invention might be used without processing exceptions (e.g. Java exceptions), such processing is often useful and will now be described, in the example of Java. If exceptions are processed, they use an exception class, which is preferably also a struct-like class. The same translation as for any other struct-like class applies, except that if the exception class has a constructor with a single String parameter (which preferably all exceptions do), a field called detailMessage may be added to the generated RPC structure. This allows RPC server procedures in C to generate Java exceptions with detail messages.

As known, a Java method may have a throws clause that states what checked exceptions it can throw. Methods in Remote interfaces (or superinterface) must declare at least java.rmi.RemoteException in their throws clause (see the throws clause in E2-3), and may declare other exceptions. This is a requirement of true RMI, but might be ignored in another context. More formally:

each method must declare an exception class like java.rmi.RemoteException in its throws clause; and each other exception declared in the throws clause must be a struct-like class that is a subclass of a main exception class like java.lang.Throwable and that has an accessible no-argument constructor or a constructor with a single argument of a main string type like java.lang.String.

RPC Language has no notion of exceptions. So, instead, in accordance with this invention, the return value of the generated procedure is declared as a discriminated union (as shown in E2-2). The discriminator is an integer that is 0 if the procedure returned successfully, and otherwise an index (starting at 1) of which exception it generated. The arms of the union then contain the normal return type for case 0, and individual exception types for the other cases. The generated "trans1" client (M114, FIG. 9) may convert this returned union into a normal Java return or a thrown Java exception. The writer of the "trans1" server M311 (FIG. 9) may fill in this discriminated union manually. Macros may be generated to make this easier. The data types in the arms of this union follow the same translation rules as described above. The discriminator values may be defined with const statements in the RPC Language so that they will appear as #define macros in the C header file generated by rpcgen.

In a precise, purely exemplary, embodiment, concerning Java and RPC, every method in a Remote interface should satisfy the following conditions:

it should declare java.rmi.RemoteException in its throws clause (this condition is shared with true RMI); and each parameter must be a primitive type, a wrapped primitive type, String, Class, a Remote interface, a struct-like class, or an array of any of these; and the return type must be void, a primitive type, a wrapped primitive type, String, Class, a Remote interface, a struct-like class with an accessible no-argument constructor, or an array of any of these, or it must be OneWay (to be described below); and each exception declared in the throws clause should be a struct-like class that is a subclass of java.lang.Throwable (this is a Java requirement) and that has an accessible no-argument constructor or a constructor with a single argument of type java.lang.String.

The method may be a "one way" method, if its return type is the interface OneWay. Then, the caller of the Java client stub will not expect a return value; the Java server skeleton will not send a reply; and the generated RPC Language file will use a nonstandard oneway keyword to specify that there is no reply from the call.

Where a formal parameter of a method is a struct-like class, Java (the "cis1") allows "inheritance": any subclass of that class may be passed as the actual parameter. Now, the "trans1" (or "trans2") link of this invention may operate differently: only the fields declared in the class of the formal parameter will be transmitted. Similarly, fields in struct-like classes that are themselves struct-like classes will be transmitted according to their declared types, not their real types.

Alternatively, an advance towards a solution to the problem of inheritance of a struct-like class X may be based on the following:

a. as previously, the translating struct contains the fields of X,
b. it additionally contains a discriminated union with one branch for each "known subclass" of X, and a default void branch for X itself and still unknown subclasses "known subclass" of X means a subclass defined when generating X initially, or a subclass which has appeared as a parameter, return type, or field, where struct-like class X was declared.

As noted, Rmi2rpc prepares code skeleton and prototypes. Translation tools for aiding this task are described in E1.9. Also, program and/or procedure identifiers may be necessary in the second language e.g. C. This may be made as described in E1.10.

The operation of Trans1 client stubs may now be considered in more detail, in the exemplary case of Java and C/RPC.

For a Remote interface to be useful, there must be a Java object that implements it. The mechanism of FIG. 13 generates RPC client stubs in Java. Each such stub implements the methods in its Remote interface, such that calling the method on the stub object causes a Remote Procedure Call to the appropriate procedure in the appropriate program, with the XDR translation of the method's parameters. The return value or generated exception is translated back into Java after the call.

As explained above, the return type of the generated RPC procedure is a discriminated union, so that server procedures can return exception values. The data types in the arms of this union follow the same translation rules as described above. The discriminator values are defined with const statements in the RPC Language, so that they will appear as #define macros in the C header file generated by rpcgen for the lang1 server.

A Remote interface may inherit from one or more superinterfaces that are also Remote interfaces and that declare their own methods. In that case, RMI2RPC will generate "trans1" client stubs for those superinterfaces too. Preferably, the client stub for an interface that has such superinterfaces will inherit from ("extend", in Java terminology) the client stub for whichever of the superinterfaces has the most methods. Each method declared in the other superinterfaces is implemented by instantiating the corresponding client stub and invoking the method on it ("delegation"). Usually a Remote interface will inherit from just one other Remote interface, so its client stub will extend that interface's client stub only.

The above is useful with languages like Java, that do not support multiple inheritance. Other languages that do support inheritance can arrange that the client stub for an interface with multiple superinterfaces inherit from the client stub for each of these superinterfaces.

In a exemplary embodiment, a generic class Trans1Client is created in lang1. (The class is named RpcClient in the examples). An object instantiated from that class includes the function of the RMI-to-XDR module M112. When instantiated for a given "trans1" client (also named trans1 client stub), e.g. M114 (FIG. 9), such an object comprises or "encapsulates" a communications channel to a "trans1" server, e.g. M311 (FIG. 9), as visible in the last portion of E2-3. The communications channel can be used to invoke any procedure in any program handled by that "trans1" server.

Now, the object constructor of a "trans1" client stub like M114 has a parameter of type Trans1Client, from which there is generated methods directed to the creation, access (and deletion, if desired) of an instance (e.g. Trans1Client114 of the class Trans1Client. This object Trans1Client114 can subsequently be retrieved using the public getTrans1Client() method in the generated "trans1" stub M114. Thus, a "trans1" client stub M114 knows where to send its "trans1" calls.

The Trans1Client class handles the headers of Trans1 requests and replies. Encoding the parameters into XDR, and decoding the return value from XDR, is the business of the caller stub. "Trans1" client stubs may be filled in with the necessary code. The Trans1Client class may have several implementations, for example a TcpRpcClient, providing a connection-based RPC client over TCP. A connection-based RPC client over UDP may be used in addition, or instead.

An Trans1Client may be connected directly to a given port on a given host. Alternatively, it may use the rpcbind (formerly portmap) protocol to map RPC program numbers to ports. Users who want to do that can use rmi2rpc straightforwardly to create a client of the rpcbind protocol.

Figure 20:
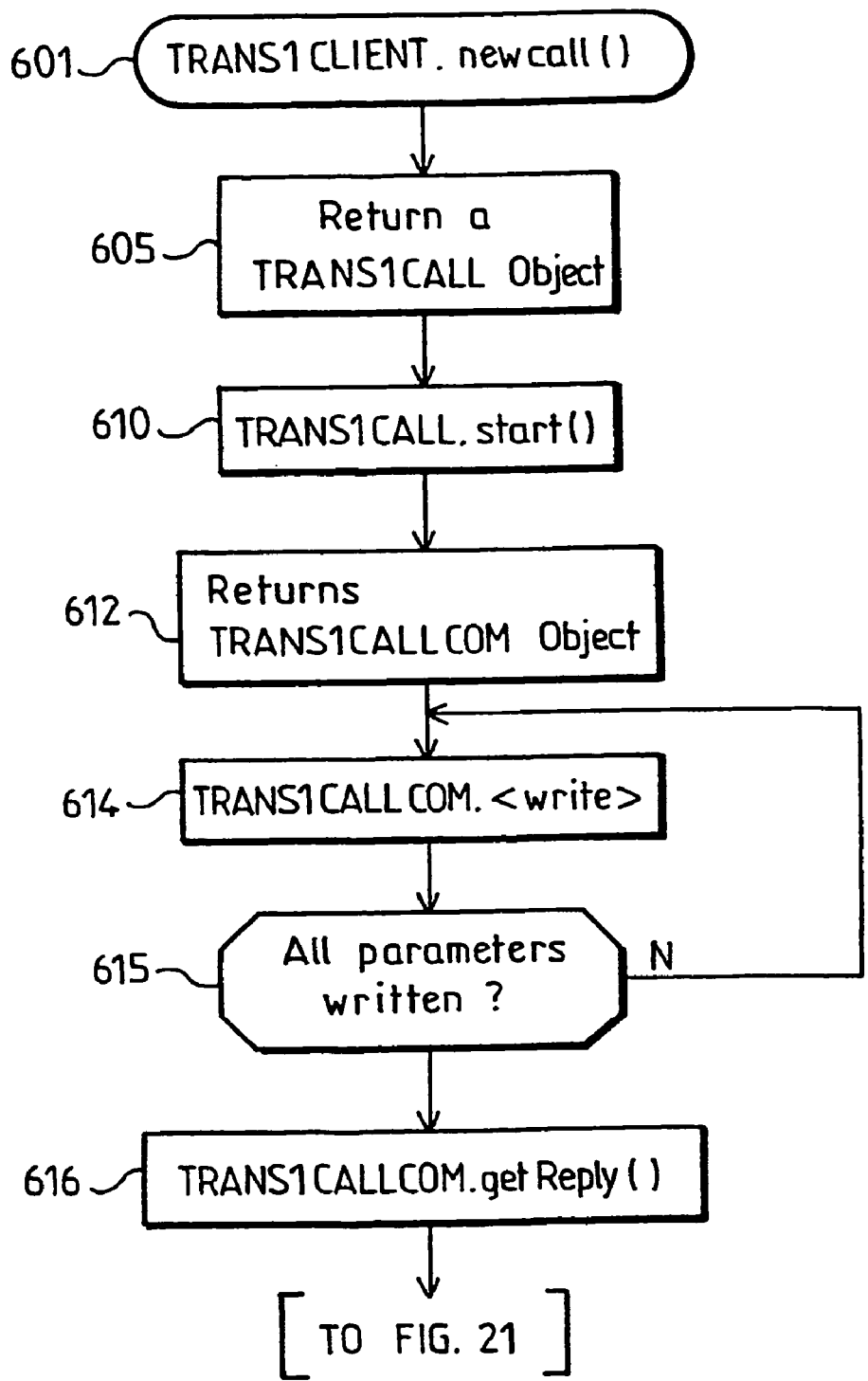
Figure 21:
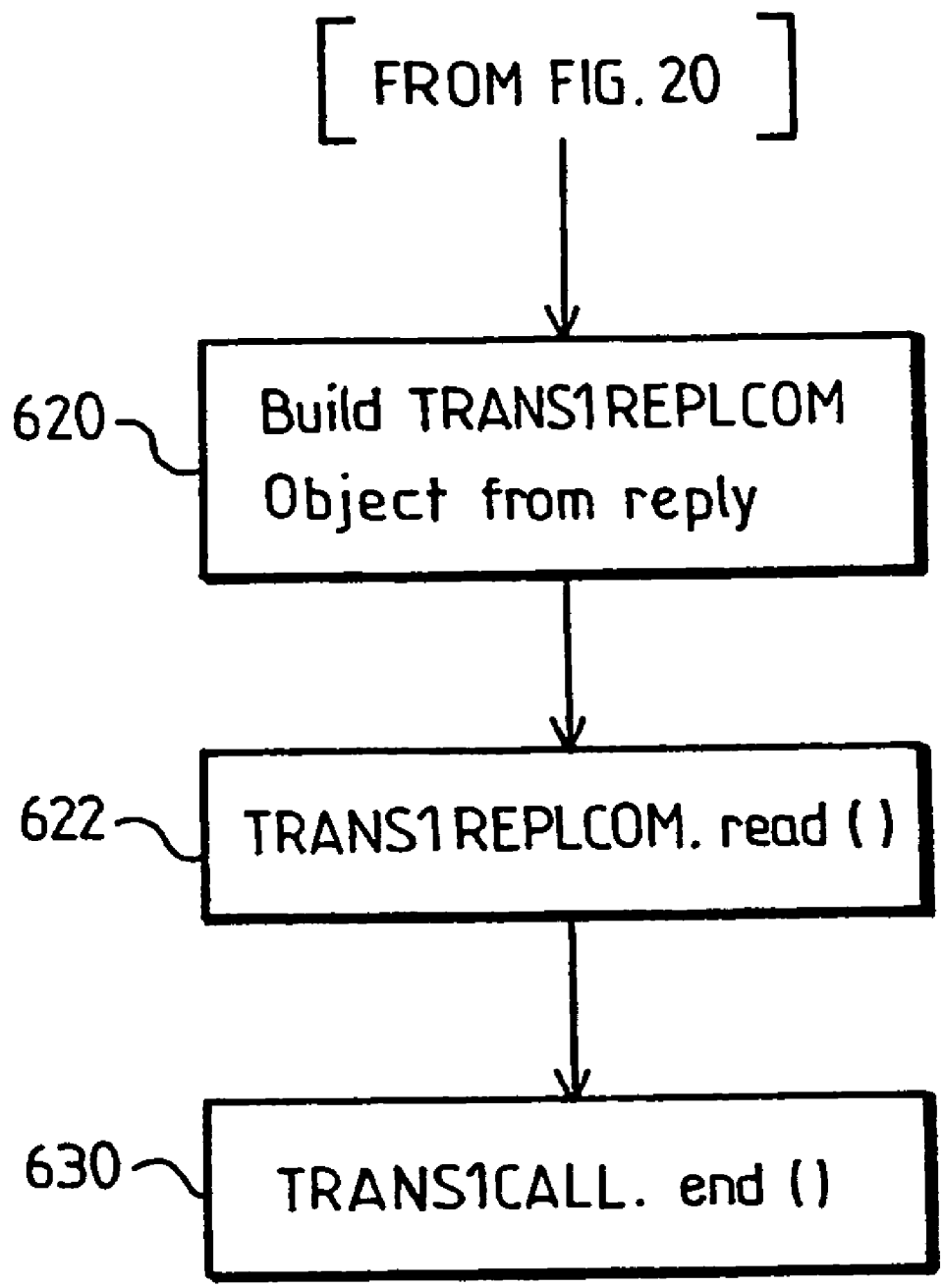

An embodiment of this invention will now be described in more detail with reference to FIGS. 20 and 21 (in which the procedure parameters are not shown).

At 601, a "trans1" call starts by invoking the newCall() method of a Trans1Client, giving as parameters the program, version, and procedure numbers of the procedure to be called. The return value at 605 is a Trans1Call object.

Operation 610 calls the start () method of the Trans1Call object (e.g. RpcCall call in E2-3). This begins the call proper, by writing the headers of the call (a trans1 request in the example). At 612, the start () method returns a "Trans1" call communication or Trans1Call object, e.g. XdrOutputStream (in short xout). One or more operations 614 involve calls like writeInt and writeBoolean which are made on the Trans1Call object, to write the parameters of the procedure, until all are written (615). Then, at 616, the Trans1Call object's getReply method finishes sending the parameters and awaits the result of the "trans1" call (RPC call in the example).

In accordance with the "cis2" rules (RPC rules in the example), "trans1" server M311 (FIG. 9) returns via module 313 an organized flow of data, e.g. an XDR stream. At 620, module M112 converts this into a Trans1ReplCom object, e.g. XdrInputStream, having e.g. reading methods as readInt (), read Boolean(), which can be used to read the return value. The appropriate reading method is done at 622. Finally, at 630, the Trans1Call object's end () method terminates the call, allowing a queued up RPC to proceed at 603, if there is one. It also releases intermediate objects like Trans1Call and Trans1ReplCom.

Similarly, a called interface ("trans1" server M311) may declare that it returns an object MyReturnObject of a Remote interface type. If so, the "trans1" client stub M114 should contain code to make an object HisReturnObject implementing that type. The HisReturnObject object should itself be another "trans1" client stub, based on the real type of the MyReturnObject object to be received (which may be a sub-interface of the declared interface). Rather than hard-code the details of client stub fabrication in generated Java code, the initial creator of a client stub M114 can specify a stub factory, i.e. a user object implementing a Trans1StubFactory (e.g. RpcStubFactory) interface (not shown in E2-3, since the example has no method returning a Remote type). When a reference to a remote object MyReturnObject is received, the stub factory is consulted to convert MyReturnObject into a client stub HisReturnObject. Typically this client stub will have the same stub factory as the stub that created it.

The Trans1Client and Trans1Server objects may include hooks for respectively specifying and verifying authentication credentials. Null authentication may be supported by default, with users being able to implement one of the standard authentication flavors, or implementing their own.

The Library M316 (FIG. 9) will now be considered in more detail, in the exemplary case of C as lang2.

The C library rmi2rpclib or M316 (FIG. 9) manages and maintains a list of remotely-exported objects with their types. It can take a remote reference to a local object and translate it into the address of the local object itself, and vice versa. A remotely-exported object should correspond to a Remote interface in Java.

Rmirpclib uses the program number for that interface as a TypeCode. This may be aided by the library macros or functions described in E1.11. The above mentioned functions, or some of them, may be contained in files M315 of FIG. 9.

After the above developments on a trans1 link, e.g. between Java clients and C servers, the reciprocal trans2 link, e.g. between RPC servers in Java and C client (or indeed Java clients) will now be considered. Like in the trans1 case, two different modes may exist in a trans2 link:
- a trans2-1 Remote interface X (that inherits from java.rmi.Remote in the example), or
- a trans2-2 Remote interface X, (that inherits from SingletonRemote in the example).

In detail, operation 8506 of FIG. 17 works as follows in the Java/RPC/C example:
- for every Remote interface X named in the list TRANS2_CLASS0, or referenced from one of the interfaces in that list (as a parameter, return type, or super-interface), a Java source file (e.g. XRPCServ) is generated in the output Java package.
- in the case of a trans2-1 Remote interface X, a class XRPCServ (with no superclass other than Object) is generated. This class has a constructor with an argument of type Rmi2RpcImplFactory which:
  - provides an "object factory" that takes a Reference representing the "remote this" that the RPC client has sent, and
  - converts it into an object that implements the interface X and corresponds to the Reference.

The class also has a method registers() that takes an argument of type RpcServer, representing the RPC server with which this RPC program should be registered. A corresponding example is shown in E2-4.
- in the case of a trans2-2 Remote interface X, the mechanism may be somewhat different. The constructor may take directly a parameter of type X that is the object whose methods will be called to service incoming calls for this RPC program. This reflects the fact that there is no "remote this" in RPC procedures from this kind of interface. There is still a register() method as before.

Additionally:
- one may use a Trans2Server class in lang1 (named e.g. RpcServer), in a way similar to the above discussed Trans1Client class, i.e. to handle the headers of Trans1 requests and replies, to encode the parameters into XDR, and to decode the return value from XDR. Subclasses may be prepared, e.g. TcpRpcServer and/or UdpRpcServer, to meet the needs of one or more transmission protocols.
- one may also use a Trans2FactoryInterface (e.g. Named Rmi2RpcImplFactory), that is responsible for converting the "remote this" of a received "trans2" request into a Java object implementing the Remote interface the Trans2ServerSkeleton was derived from. A typical example of an implementation factory is an object that looks the "remote this" string up in the RMI registry M107 (FIG. 9) and returns the object it finds.
- the Java object name library (M117 in FIG. 9) corresponds to the rmi2rpclib library described above. Its principal function is to translate from a string representing a "remote this" into the corresponding Java object. A standard Java class such as Hashtable may be used for this purpose.

Figure 22:
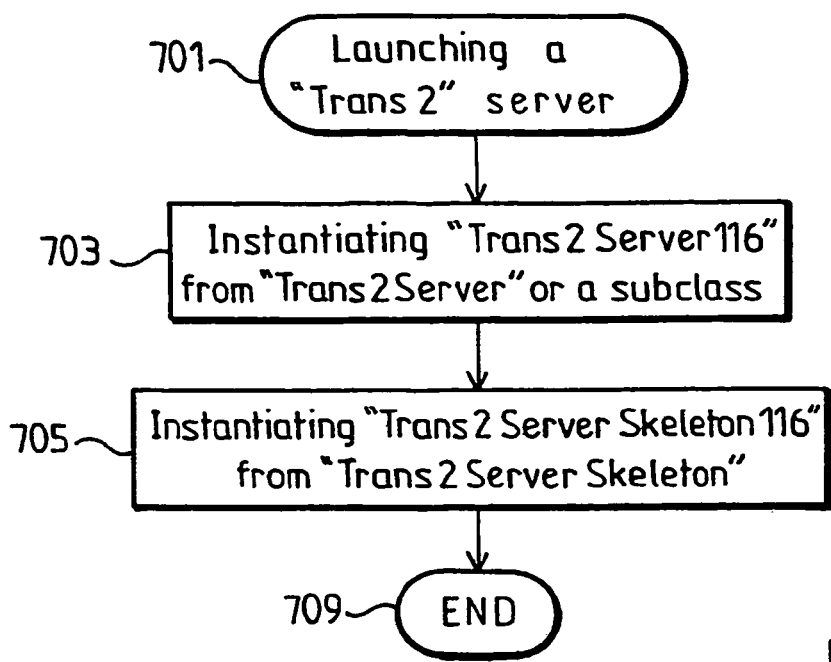

FIG. 22 shows an exemplary way of launching a "trans2" server (701), using the above prepared files:
- at 703, there is created an object (named for convenience Trans2Server 116, FIG. 9) instantiating Trans2Server, or a subclass of it; optionally, one may arrange for server threads to be created automatically as client requests come in. For example, a method in Trans2Server 116 specifies the maximum number of threads that will be created automatically to service incoming requests. If it is 0, no thread will be created automatically;
- at 705, there is created an instance Trans2ServerSkeleton 116 of the Trans2ServerSkeleton class, giving an implementation factory as a parameter to the object constructor; the instance Trans2ServerSkeleton 116 contains a "Trans2" (e.g. RPC) program, which is intended to be exported through the "trans2" server; a register() method of Trans2ServerSkeleton 116 may be called to register the "trans2" (RPC) program with the object Trans2Server 116;
- then, the "end" 709 is reached, and the server is ready to receive a call.

Figure 23:
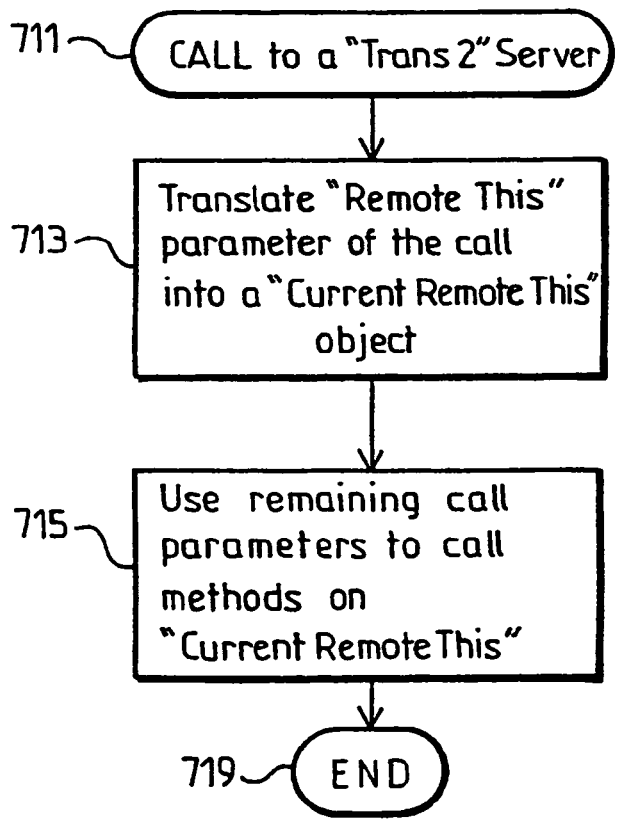

Turning now to FIG. 23, a call 711 to the trans2 server is processed as follows:
- at 713, the implementation factory is called to translate the "remote this" parameter of the call; this gives a CurrentRemoteThis object;
- at 715, the remaining parameters are used to call the appropriate method on the CurrentRemoteThis object;
- then, the "end" 719 is reached, and the server is ready to receive a new call, or to process a queued call.

For an interface S that implements SingletonRemote, the generated skeleton takes a parameter of type S rather than an implementation factory. An incoming call results in a method call on this S object.

In the example, the code prepared at 8506 (FIG. 17) may comprise RPC Language definitions, which are used via rpcgen to generate a "Trans2" client (e.g. RPC/C) that is compatible with the "trans2" (e.g. Java) servers. Similarly, "Trans1" clients e.g. in Java generated by rmi2rpc will also be compatible with the "trans2" (e.g. Java) servers (although it is more appropriate ti use RMI if both the client and server are in Java).

It will now be apparent that this invention bridges the gap between the world of a lang1, e.g. Java with its RMI communication, and the world of a lang2, e.g. C with its RPC. A tool like RMI2RPC takes a Remote interface specified in Java and generates a lang2 description that corresponds to it, plus lang1 code for a trans1 client stub that is equivalent to the cis1 client stub described above. Calls to methods in the client stub are translated into the lang2 protocol so they can be sent to a trans1 server written in lang2 based on the generated lang2 description.

This invention provides a convenient approach for communicating e.g. between Java and C, using e.g. the applicant company's RPC (Remote Procedure Call) protocol, while still retaining a good source-code compatibility with RMI. The approach is advantageous when the overhead of a full CORBA infrastructure is prohibitive, or when such an infrastructure is not available on a platform being used. It also blends well with existing C applications that already use RPC.

More precisely, Rmi2rpc provides a useful alternative to RMI or RMI-IIOP in mixed-language systems without access to an ORB. It is also a convenient way to access existing RPC services. The similarity to true RMI provides an avantageous migration path when moving from C to Java.

In the above examples, working from Java to RPC is described. Those skilled in the art will see that many features of this invention are also of interest when conversely working from RPC (the second language) to Java (the first language), e.g. generating Java interfaces from .x files rather than the reverse.

This invention also encompasses software code, especially when made available on any appropriate computer-readable medium. The expression "computer-readable medium" includes a storage medium such as magnetic or optic, as well as a transmission medium such as a digital or analog signal.

Exhibit E1—Rules of Mapping and Conversion

E1.1—Character Encoding

The first and second languages may use different character encoding. For example, Java strings contain Unicode characters, while RPC strings normally contain ASCII characters. Character encoding problems may be avoided for example by:
- confining the data exchanges to the compatible characters (e.g. the Java clients pass only strings containing ASCII (or e.g. Latin-1) characters to RPC servers);
- enhancing the less powerful side (e.g. the RPC servers are prepared to handle Unicode-compatible encoding, like UTF-1 encoding).

E1.2—Transmittable Fields

Fields are termed "non transmittable" when they have certain attributes which make they should not be transmitted through a "trans1" or "trans2" connection. This may apply to:
- an attribute like "transient" in Java, since a "transient" field is not an essential part of the data in an object.
- an attribute like "static" in Java, since a static field is defined at the level of the class, thus being common to all objects instantiating the class.

E1.3—Translatable Types

The following rules may be applied in a purely exemplary embodiment:
- char and short are not true RPC types (they are encoded the same as int), but declaring them as such means they will appear intact in C code generated by rpcgen.
- Wrapped primitive types such as Integer and Boolean are translated in the same way as the corresponding primitive types, except when they appear as volatile fields in struct-like classes, where the RPC * notation for pseudo-pointers is used to allow them to be null.
- Java's String and char[] types are converted into RPC's string<> type (a string of unbounded length).
- Java arrays of short, int, long, float, or double are translated into RPC unbounded arrays of the corresponding types. (Arrays of short take four bytes per character in RPC because there is no short type in XDR)
- arrays of byte or boolean are translated into RPC's opaque array type, which is an array of bytes.
- Restrictions on the RPC Language syntax mean that every array type referenced in parameters or return types must have its own typedef generated. This typedef is output the first time the array type is seen.
- A Java array of any other translatable type X is converted into an RPC array of the RPC translation of X.
- A struct-like class is translated into an RPC struct of the same name (omitting the Java package name), in which each Java field is translated into an RPC field of the same name and with a type from the rules specified here. Fields marked private, static, or transient are not translated.
- If the superclass S of a struct-like class C is itself a struct-like class, then the translation of C starts with a member called super whose type is the translation of S. Since super is a reserved word in Java, a struct-like class generated by the Java compiler cannot already have a member of that name. In the C language, a pointer to C can legitimately be cast into a pointer to S.
- An exception class must be a struct-like class. The same translation as for any other struct-like class applies, except that if the exception class has a constructor with a single String parameter (which by convention all exceptions do) a field called detailMessage is added to the generated RPC structure. This allows RPC server procedures in C to generate Java exceptions with detail messages.
- A Remote interface type that appears as a parameter or return type to a method in a Remote interface being translated is converted into a "remote this" that allows conversion between an RPC client stub implementing the interface (in the Java world) and a pointer to a corresponding object in the RPC server (in the C world). This is explained further below.
- the Java class Java.lang.Class is considered to represent the type of a Remote interface object. It is converted into a type code. Type codes are explained below.
- Java characters in char and String variables are 16-bit Unicode characters, while RPC strings normally contain ASCII characters. Information will be lost if characters that do not fit in 8 bits are transmitted over RPC.

E1.4—Translation of Constants

The following rules may be applied in a purely exemplary embodiment:
- Where possible, each field in a Remote interface is translated into a #define in the RPC Language output (prefixed by a % character to cause it to be passed through to the C code generated by rpcgen)

Fields of type int, short, or byte may be translated using RPC's const syntax instead; this syntax only applies to signed 32-bit integer constants.

Fields that are used to specify procedure numbers are not translated. Constants of Java's primitive numeric types (int, float, etc) and their wrapped equivalents (Integer, Float, etc) may be translated into C constants simply by writing them to an output stream.

Constants of Java's other primitive numeric types (long, float, double) are translated into C constants by writing them to an output stream with respective suffixes F, LL, and nothing. LL signifies a long long constant (at least 64 bits), as defined in the latest C standard.

Constants of the primitive type boolean are translated into TRUE or FALSE; these constants are defined in the standard RPC include files.

Constants of wrapped primitive types such as Integer and Boolean are translated like their primitive equivalents. If the value is null the constant is not translated.

Constants of type String or char may be translated into C string or character constants, provided they do not contain any non-8-bit characters. Appropriate escape sequences are used for non-printing characters.

A constant of struct-like class type must contain members that are themselves constant.

It is translated into a brace-enclosed list where the members of the list are the translations of these constant members. The translation is done using the rules explained in this section. This #define can then be used to initialize a variable of the corresponding C struct generated by rpcgen. If any member is untranslatable, no initializer is generated.

An array of any number of dimensions whose type is one of the preceding types is translated into a brace-enclosed list suitable for initializing a C array. For arrays of more than one dimension, using this initializer implies knowing something about the structure of the array, since C requires explicit sizes for every dimension in an array definition except the first, and this size must be at least as big as the largest subarray in that dimension. Rmi2rpc may output constants to help avoiding such difficulties Constants of any other Java type are not translated into the output RPC Language.

E1.5—Recursive Struct-like Class

It is recalled that, in Java and other languages, a volatile field may be modified by other threads (see also E1.7 about volatile fields).

One should avoid that the XDR representation of a struct-like class might become infinitely recursive. If A and B are struct-like classes, then A contains B if A has a field of type C that is not volatile and either C is the same as B or C contains B. The constraint is then that a struct-like class may not contain itself; however, it may contain an array of itself (because the recursion can be stopped when the size of the array is 0). Similarly, a struct-like class may reference itself in a volatile field (because the recursion can be stopped when the reference is null).

E1.6—Optional Features of a Struct-like Class

These features, which are mostly independent from each other, are as follows:

a struct-like class has no methods (this is for simplification only);

a struct-like class and each of its "transmittable" fields (or methods, if any) will usually need to be public to avoid access problems.

if a struct-like class has private fields, these should be also non transmittable (i.e. static or transient);

a superclass of a struct-like class should be also a struct-like class.

However, there may be exceptions to the above cited access-related conditions, e.g. where the name of entities are predefined or otherwise determinable a priori, since such names may be hard-coded or otherwise pre-defined in lang2. This avoids problems e.g. with root classes, like Object and Throwable (if they were not allowed to have non-static non-transient private fields, then every other Java class would be either).

E1.7—Detailed Features of the Object Model

In true RMI, Java will if necessary transmit the complete graph of objects accessible from a given object. Such a graph of objects may also be mapped to RPC, subject to certain precautions, e.g. where graphs contain cycles: for example, one may generate RPC declarations based on the actual classes referenced (even though, at run-time, objects might be of sub-classes) and throw an exception at run-time if a cycle is detected.).

In RPC Language, like C, a structure ("C object") may:

contain other structures; in FIG. 18, the structure or C object O1 contains structures OA and OB.

reference another structure, via a pointer that may be null.

In FIG. 19, structures OA and OB are apart; structure O2 has pointers O2a and O2b referring to OA and OB, respectively. Structure O3 has pointers O3a to OA, and pointer O3c to a "null" object. Java has only the notion of reference: a Java object may reference another Java object. Reference is different from containment in two respects, as shown in FIG. 19: a reference may be null, and an object may be referenced in more than one place whereas it can only have one container.

If desired, this difference of behaviour may be accommodated by using at least one of the following solutions:

simply consider that a field of a struct-like class that is itself a struct-like class is actually contained rather than referenced. The same is true for fields that are arrays or wrapped primitive types.

provide a per-field way to specify whether containment or reference is intended. For example, where reference is explicitly desired, allow it to be indicated by marking the reference field volatile. This solution is particularly useful for self-referential data structures such as linked lists.

get the behaviour of references by declaring an array, which can then be of size 0 to represent null or size 1 to contain a reference.

E1.8—Exemplary Naming Conventions

The prefixing Java package name may be generally omitted, if one should avoid unacceptably long names, e.g. in C language.

The RPC name of a struct generated for a struct-like Java class is the same as the name of that class without its package prefix. Java fields are translated into RPC fields, as described. The names of fields in a struct generated for a struct-like class are the same as their names in the original Java. Fields marked private, static, or transient are not translated.

The RPC name of the program and version generated for an interface is the name of the interface, followed by _program or _version respectively.

The RPC name of a procedure generated for a method in a Remote interface is the name of the interface, followed by an underscore and the name of the method. So for instance, a method size() in interface com.packco.containers.Box will generate RPC procedure Box_size.

It may happen that a translated interface contains more than one method of the same name <x>, with x="MyMethod" (so called overloaded methods). If so, the RPC names of all but one of them may be given a suffix of an underscore followed by an integer, e.g. <x>_1, <x>_2, etc. This is only needed for overloaded methods declared in the same interface; if a method overloads a method inherited from a superinterface, the distinction is implicit from the fact that they belong to different RPC programs.

If the RPC name of a procedure is <X>, as determined by the rule above, then the discriminated union generated for its result is called <X>_result. The discriminator value for when the procedure returns normally (does not generate an exception) is called <X>_OK. The discriminator value for exception Y (where the package prefix has been stripped from Y) is called <X>_Y.

The RPC name (i.e. the C name) of a constant generated for a field in a Remote interface is the same as it would be for a method of the same name: the name of the interface without its package prefix, an underscore, and the name of the field.

E1-9—Translation Tools

In accordance with the above described exemplary naming rules, some constraints should be observed in the Remote interfaces to be translated into RMI2RPC. The principal ones are that the class names must be unique across packages, and that they must not contain characters that are legal in Java identifiers but not C identifiers (e.g. "$", and Unicode characters that are not ASCII).

Some work is left to the programmer, when converting Java code into RPC code or C code, and conversely. A number of functions may be incorporated in RMI2RPC to help this., for example:

change "identifiersLikeThis" into "identifiers_like_this", or conversely. This is very useful because the former convention is usual in Java, but C programmers who favour it will be discouraged by rpcgen's behaviour whereby it forces function names into lower case: identifiersLikeThis.

pattern replacements, enabling the user to specify the C translation of individual Java names or names matching regular expressions, or conversely.

type translation plug-ins.

Pattern replacements use regular expressions to specify details of generated code, including output file names. Each replacement has a left-hand-side (LHS) that is a regular expression and a right-hand-side (RHS) that is a replacement for strings matching that expression. The RHS may contain references such as {2} which refers to the text matched by the second pair of parentheses in the LHS. To take an example, if the command-line specifies—javaclientname (.*)\.(.*)= {1}.stubs. {2} Stub then the RPC stub for an interface called com.packco.containers.Box will be in the class com.packco.containers.stubs.BoxStub.

Pattern replacements enable the user to specify the details of Java RPC client and server class names, output RPC Language filenames, and C identifiers.

Basically, rmi2rpc knows how to translate a basic set of Java types into RPC. Type translation plug-ins may be used to enable the user to extend that basic set. For instance, user classes that encapsulate enumerations or unsigned integers can be translated into the RPC enum and unsigned int types.

Since Java is its own scripting language, these plug-ins may be Java classes named on the command-line and loaded dynamically. Each one must implement the interface AnalysedClassFactory so that it recognizes a Class object to which it applies and converts it into an AnalysedClass. AnalysedClass is an abstract class which must be implemented with a set of methods specifying what type is called in Java and in RPC, how it is defined in RPC if necessary, Java code fragments to convert it to and from XDR, and so on.

A standard list of such factories (AnalysedClassFactory) may be provided, together with optional additional factories, consulted in a predefinable order. The class analysis may be made using a concept similar to that of the "Doclets" in the JavaDoc context.

http://java.sun.com/j2se/javadoc/index.html.

E1.10—Program and Procedure Numbering

An exemplary way of making the program and procedure numbering in RPC will now be described. An RPC program definition may include:

a number for that program, that distinguishes it from other programs, a version number that distinguishes it from other versions of the same program, and/or a number for each procedure it contains.

By default, rmi2rpc generates a program number by constructing a hash code of the translated Remote interface, in such a way that any significant change to the interface will produce a different program number. (This is similar to the serialVersionUID used by Java serialization.) Program numbers are 32-bit integers, so the risk of two different Remote interfaces producing the same number is small. A hash code having the desired robustness is selected, e.g. the one based on the cryptographically-secure MD5 while taking care that the input to the MD5 algorithm is different for different interfaces.

ftp://ftp.isi.edu/in-notes/rfc1831.txt and in the corresponding printed documentation.

The default program number may be replaced by including an int constant called TYPE_CODE in the interface being translated. This is useful if the interface is modified in ways that change the hash code but are not really significant. It is also useful to interface with existing RPC services.

The RPC version number is 1 by default. If the interface being translated includes an int constant called VERSION_CODE, its value is used as the version number. RPC procedure numbers may be assigned sequentially starting from 1. The order in which the procedures appear is not the same as the order they were declared in the original Java source file. Instead, they are sorted into alphabetical order (with additional sorting for overloaded methods). This is done principally so that changing the order of declarations in the Java source file has no effect on the generated RPC stub.

RPC procedure numbers may be assigned sequentially starting from 1. The order in which the procedures appear may not be the same as the order they were declared in the original Java source file. Instead, they may be sorted into alphabetical order (with additional sorting for the overloaded methods). Interestingly, changing the order of declarations in the Java source file has no effect on the generated RPC stub. Alternatively, explicit procedure numbers may be assigned to the RPC methods e.g. as follows. For every method in the interface being translated, there should be an int constant field of the same name. The value of this field is the procedure number for the translation of the method. Preferably, if any method is assigned a procedure number in this way, all must be. If the interface has more than one method of the same name, a "_n" suffix is added both to the RPC procedures to disambiguate and to the field names. In practice it is best to avoid overloading when explicit procedure numbers are wanted.

Program numbers also act as type codes, which can be used by RPC servers to refer to Remote interface types, and by code in the RMI-over-RPC libraries (contained in M316) to find the Java type corresponding to a remote reference received from an RPC server.

E1.11—Library Macros/Functions.

The following functions or macros may be provided (and generated by RMI2RPC at least in the form of prototypes):

is_same_type takes two TypeCode arguments and returns 1 if they are the same type, 0 otherwise.

type_initializer takes an integer argument that is a program code and returns text that can be used to initialize a TypeCode variable with that code.

is_known_type returns 1 if its argument is the type code of a known Remote interface (one of the Remote interfaces analysed by this run of RMI2RPC), 0 otherwise.

is_subtype returns 1 if the first and second arguments are the type codes of known Remote interfaces and the first interface is a subinterface of the second. An #include " . . . " directive with an appropriate argument may be added in the generated C file (this is also true for the .h file generated by rpcgen).

register_remote_object remotely exports a C object x of Java type X, e.g. on behalf of a RPC server calling that function, and giving this C object x a user-supplied name. The constant X_program will have been included in the header file generated by rpcgen from the RPC Language translation of the Java interface X.

when an object x is destroyed, the RPC server may call unregister_remote_object with the same parameters as register_remote_object. This ensures that a remote reference to x that arrives subsequently will produce an error in the attempt to translate it into a local C object.

once the address of a local object has been registered with rmi2rpclib, it can be converted into a remote reference that can be returned from an RPC server procedure, using an operation object_to_remote_object().

remote_object_to_object: a received remote reference, such as the "remote this" parameter in the translation of an RMI method, may be converted back into the corresponding C object.

it is possible to enumerate this list using the enumerate_objects and next_object functions.

This can be useful for instance to find all objects of a particular Remote interface type. In practice, the enumerate_objects function initializes a variable of type object_enumerator to hold the enumeration context. Subsequent calls to next_object return the exported objects one by one, giving their local addresses and their types. If any object is exported or unexported during the enumeration, the object_enumerator becomes stale and next_object will return an error.

---

Exhibit E2
E2-1 - Java - Random.class
import java.rmi.Remote;
import java.rmi.RemoteException;
public interface Random extends Remote {
    byte[ ] gen(int bits) throws RemoteException;
}
E2-2 - RPC language definition file - random.x
typedef string remote_object<>;
typedef opaque byte_array<>;
struct RemoteException {
    string detailMessage <>;
};
const Random_gen_OK = 0;
const Random_gen_RemoteException = 1;
union Random_gen_result switch (int result) {

---

-continued case Random_gen_OK:
    byte_array result_OK;
case Random_gen_RemoteException:
    RemoteException result_RemoteException;
};
program Random_program {
    version Random_version {
        byte_array Random_gen(remote_object rem_this,
            int bits) = 1;
    } = 1;
} = 1195528291;
E2-3 - Java - RPC stub class from Random.class
import java.io.*;
import java.rmi.*;
import com.sun.rmi2rpc.*;
import com.sun.rmi2rpc.rpc.*;
public class RandomStub
        extends Rmi2RpcStub implements Random {
    public static final int TYPE_CODE = 1195528291;
    public static final int VERSION_CODE = 1;
    public RandomStub(RpcClient rpc,
            String remThis) {
        super(rpc, remThis);
    }
    public byte[ ] gen(int p1)
        throws RemoteException {
        RpcCall call =
            Rpc.newCall(TYPE_CODE,
                VERSION_CODE,
                1);
        XdrOutputStream xout = call.start( );
        xout.writeString(getRemoteReference( ));
        xout.writeInt(p1);
        XdrInputStream xin = call.getReply( );
        byte[ ] result = xin.readByteArray( );
        call.end( );
        return result;
    }
}
E2-4 - RPC server in Java, callable by remote C programs:
import java.io.*;
import java.rmi.*;
import com.sun.rmi2rpc.*;
import com.sun.rmi2rpc.rpc.*;
public class RandomServ {
    public static final int TYPE_CODE = 1195528291;
    public static final int VERSION_CODE = 1;
    public RandomServ(Rmi2RpcImplFactory implf)
    {
        rmi2RpcImplFactory = implf;
    }
    private Rmi2RpcImplFactory
        rmi2RpcImplFactory;
    private Random convertRemote(String remThis)
    {
        Remote remote =
            rmi2RpcImplFactory.convertRemote(remThis);
        return (Random) remote;
    }
    public void register(RpcServer server) {
        server.register(TYPE_CODE, VERSION_CODE,
            1, new RpcProcedure( ) {
            public void call(XdrInputStream xin,
                    XdrOutputStream xout) {
                String remThis = xin.readString( );
                Random impl = convertRemote(remThis);
                int p1 = xin.readInt( );
                byte[ ] result = impl.gen(p1);
                xout.write(result);
            }
        });
    }
}

The invention claimed is:

1. A method for inter-process communication between a first process and a second process, comprising:
receiving a request from the first process for processing a first process call in a first programming language by the second process, wherein the second process is configured to execute in a second programming language;
providing the second process with a procedure to emulate the processing of the first process call, comprising:
sending the second process a procedure parameter identifying a data structure, and
providing the second process with type-defining code representing a data type from the first programming language, wherein the procedure is defined in the data structure;
converting the first process call into a second process call to the procedure using the data structure;
executing the second process call using the procedure to obtain a result; and returning the result to the first process.

2. The method of claim 1, wherein converting the first process call to the second process call is partially performed by the first process.

3. The method of claim 1, wherein the data structure determines a method representing the first process call in the second programming language.

4. The method of claim 1, wherein the first programming language is an object oriented programming language and the second programming language is a non-object oriented language.

5. The method of claim 1, wherein the first programming language is a non-object oriented programming language and the second programming language is an object oriented programming language.

6. A computer storage medium comprising computer executable code, which when executed by a processor, performs a method, the method comprising:
receiving a request for processing a first process call from a first process in a first programming language by a second process, wherein the second process is configured to execute in a second programming language;
providing the second process with a procedure to emulate the processing of the first process call, comprising
sending the second process a procedure parameter identifying a data structure, and
providing the second process with type-defining code representing a data type from the first programming language, wherein the procedure is defined in the data structure;
converting the first process call into a second process call to the procedure using the data structure;
executing the second process call using the procedure to obtain a result; and
returning the result to the first process.

7. The computer readable storage medium of claim 6, comprising computer executable code, which when executed by a processor, performs a method, wherein the method further comprises converting the first process call to the second process call is partially performed by the first process.

8. The computer readable storage medium of claim 6, wherein the data structure determines a method representing the first process call in the second programming language.

9. The computer readable storage medium of claim 6, wherein the first programming language is an object oriented programming language and the second programming language is a non-object oriented language.

10. The computer readable storage medium of claim 6, wherein the first programming language is a non-object oriented programming language and the second programming language is an object oriented programming language.

11. A system for inter-process communication between a first process and a second process comprising:
a processor;
a memory; and
a storage device encoded with functionality to:
receiving a request for processing a first process call from the first process in a first programming language by the second process, wherein the second process is configured to execute in a second programming language;
providing the second process with a procedure to emulate the processing of the first process call, comprising:
sending the second process a procedure parameter identifying a data structure, and
providing the second process with type-defining code representing a data type from the first programming language, wherein the procedure is defined in the data structure;
converting the first process call into a second process call to the procedure using the data structure;
executing the second process call using the procedure to obtain a result; and
returning the result to the first process.

12. The system of claim 11, wherein converting the first process call to the second process call is partially performed by the first process.

13. The system of claim 11, wherein the data structure determines a method representing the first process call in the second programming language.

14. The system of claim 11, wherein the first programming language is an object oriented programming language and the second programming language is a non-object oriented language.

15. The system of claim 11, wherein the first programming language is a non-object oriented programming language and the second programming language is an object oriented programming language.

* * * * *